US010080244B2

(12) United States Patent
Lei et al.

(10) Patent No.: US 10,080,244 B2
(45) Date of Patent: Sep. 18, 2018

(54) RANDOM ACCESS CHANNEL DESIGN FOR NARROWBAND WIRELESS COMMUNICATION

(71) Applicant: QUALCOMM Incorporated, San Diego, CA (US)

(72) Inventors: Jing Lei, San Diego, CA (US); Madhavan Srinivasan Vajapeyam, San Diego, CA (US); Wanshi Chen, San Diego, CA (US); Alberto Rico Alvarino, San Diego, CA (US); Renqiu Wang, San Diego, CA (US); Hao Xu, San Diego, CA (US); Seyed Ali Akbar Fakoorian, San Diego, CA (US); Shimman Arvind Patel, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 15/244,385

(22) Filed: Aug. 23, 2016

(65) Prior Publication Data

US 2017/0064743 A1    Mar. 2, 2017

Related U.S. Application Data

(60) Provisional application No. 62/211,657, filed on Aug. 28, 2015.

(51) Int. Cl.
*H04W 74/08* (2009.01)
*H04W 72/04* (2009.01)
(Continued)

(52) U.S. Cl.
CPC ....... *H04W 74/0833* (2013.01); *H04L 5/0048* (2013.01); *H04W 72/0453* (2013.01);
(Continued)

(58) Field of Classification Search
CPC .... H04L 5/0048; H04W 16/30; H04W 72/02; H04W 72/0453; H04W 74/002; H04W 74/0833; H04W 74/00
See application file for complete search history.

(56) References Cited

U.S. PATENT DOCUMENTS

| 2008/0075043 A1* | 3/2008 | Wang | H04W 74/002 370/330 |
| 2010/0165943 A1* | 7/2010 | Kato | H04W 8/26 370/329 |

(Continued)

FOREIGN PATENT DOCUMENTS

| EP | 0760564 A2 | 3/1997 |
| EP | 1892972 A1 | 2/2008 |

OTHER PUBLICATIONS

ISA/EP, International Search Report and Written Opinion of the International Searching Authority, Int'l Application No. PCT/US2016/048408, dated Nov. 22, 2016, European Patent Office, Rijswijk, NL, 10 pgs.

*Primary Examiner* — Benjamin H Elliott, IV
(74) *Attorney, Agent, or Firm* — Holland & Hart LLP

(57) ABSTRACT

Random access techniques may use subcarriers allocated for random access requests in narrowband communication. Physical resources may be selected for transmission of a random access request based on a "coverage class" of a user equipment (UE). In some examples, a set of coverage classes may be identified based on one or more UE channel conditions, such as pathloss. Each coverage class may have one or more associated subcarriers of a set of subcarriers in a narrowband bandwidth, and random access messages may be transmitted using the associated subcarrier(s) for the coverage class of a UE. In some examples, different coverage classes may have different numbers of redundant transmissions of a random access message, which may be based
(Continued)

on channel conditions associated with a particular coverage class. A UE, based on a measured channel condition, may determine a coverage class and select a subcarrier based on the determined coverage class.

58 Claims, 17 Drawing Sheets

(51) Int. Cl.
*H04L 5/00* (2006.01)
*H04W 16/30* (2009.01)
*H04W 72/02* (2009.01)
*H04W 74/00* (2009.01)

(52) U.S. Cl.
CPC ............ *H04W 16/30* (2013.01); *H04W 72/02* (2013.01); *H04W 74/002* (2013.01)

(56) References Cited

U.S. PATENT DOCUMENTS

| | | | |
|---|---|---|---|
| 2013/0182680 A1 | 7/2013 | Choi et al. | |
| 2015/0016312 A1* | 1/2015 | Li | H04W 74/0833 370/280 |
| 2016/0219553 A1* | 7/2016 | Sundberg | H04L 1/0009 |
| 2016/0295345 A1* | 10/2016 | Oh | H04W 4/005 |
| 2017/0041873 A1* | 2/2017 | Wu | H04W 52/0219 |
| 2017/0064743 A1* | 3/2017 | Lei | H04W 74/0833 |

* cited by examiner

RANDOM ACCESS CHANNEL DESIGN FOR NARROWBAND WIRELESS COMMUNICATION

CROSS REFERENCE

The present application for patent claims priority to U.S. Provisional Patent Application No. 62/211,657 by Lei, et al., entitled "Random Access Channel Design For Narrowband Wireless Communication," filed Aug. 28, 2015, assigned to the assignee hereof.

BACKGROUND

The following relates generally to wireless communication and more specifically to random access techniques for narrowband wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some types of wireless devices may provide for automated communication. Automated wireless devices may include those implementing M2M communication (of which Machine Type Communication (MTC) will be considered a part for purposes of this disclosure). M2M communication may refer to communications that allow wireless devices to communicate with one another or a base station without human intervention. For example, M2M communication may refer to communications from devices that integrate sensors or meters to measure or capture information and relay the information to a central server or application program that can make use of the information (or present the information to humans interacting with the application program). Examples of applications for M2M wireless devices include smart metering, inventory monitoring, water level monitoring, equipment monitoring, healthcare monitoring, wildlife monitoring, weather and geological event monitoring, fleet management and tracking, remote security sensing, physical access control, wearable devices, and transaction-based business charging.

SUMMARY

Systems, methods, and apparatuses for initiating a random access procedure using selected subcarriers allocated for random access requests in narrowband communication are described. In some examples, the systems, methods, and apparatuses may select physical resources for transmission of a random access request based on a "coverage class" of a user equipment (UE). In some examples, a set of coverage classes may be identified based on one or more UE channel conditions, such as pathloss. Each coverage class may have one or more associated subcarriers of a set of subcarriers in a narrowband bandwidth, and random access messages may be transmitted using the associated subcarriers for the coverage class of a UE. In some examples, different coverage classes may have different numbers of redundant transmissions of a random access message, which may be based on channel conditions associated with a particular coverage class. A UE, based on a measured channel condition, may determine a coverage class and select a subcarrier based on the determined coverage class.

A method of wireless communication is described. The method may include identifying a set of coverage classes for a wireless device based at least in part on a characteristic of a communication link associated with the wireless device, identifying, for each coverage class of the set of coverage classes, one or more subcarriers of a set of subcarriers for transmitting random access messages, and communicating on the one or more subcarriers of the set of subcarriers.

An apparatus for wireless communication is described. The apparatus may include means for identifying a set of coverage classes for a wireless device based at least in part on a characteristic of a communication link associated with the wireless device, means for identifying, for each coverage class of the set of coverage classes, one or more subcarriers of a set of subcarriers for transmitting random access messages, and means for communicating on the one or more subcarriers of the set of subcarriers.

Another apparatus for wireless communication is described. The apparatus may include a processor, memory in electronic communication with the processor, and instructions stored in the memory. The instructions may be operable by the processor to cause the apparatus to identify a set of coverage classes for a wireless device based at least in part on a characteristic of a communication link associated with the wireless device, identify, for each coverage class of the set of coverage classes, one or more subcarriers of a set of subcarriers for transmitting random access messages, and communicate on the one or more subcarriers of the set of subcarriers.

A non-transitory computer readable medium for wireless communication is described. The non-transitory computer-readable medium may include instructions operable to identify a set of coverage classes for a wireless device based at least in part on a characteristic of a communication link associated with the wireless device, identify, for each coverage class of the set of coverage classes, one or more subcarriers of a set of subcarriers for transmitting random access messages, and communicate on the one or more subcarriers of the set of subcarriers.

Some examples of the methods, apparatuses, and non-transitory computer-readable media described herein may further include processes, features, means, or instructions for measuring the characteristic of the communication link at the wireless device. Some examples of the methods, apparatuses, and non-transitory computer-readable media described herein may further include processes, features, means, or instructions for determining that the wireless device may be in a first coverage class based at least in part on the characteristic of the communication link. Some examples of the methods, apparatuses, and non-transitory computer-readable media described herein may further include processes, features, means, or instructions for selecting a first subcarrier of the set of subcarriers for transmission of a random access message based at least in part on the first coverage class.

In some examples of the methods, apparatuses, and non-transitory computer-readable media described herein, identifying a token for each coverage class, wherein the transmission of the random access message comprises:

determining a random number associated with the random access message. Some examples of the methods, apparatuses, and non-transitory computer-readable media described herein may further include processes, features, means, or instructions for transmitting the random access message in response to the random number corresponding to the identified token.

Some examples of the methods, apparatuses, and non-transitory computer-readable media described herein may further include processes, features, means, or instructions for signaling the identified one or more subcarriers for transmitting random access messages for each coverage class to a plurality of wireless devices.

In some examples of the methods, apparatuses, and non-transitory computer-readable media described herein, the set of subcarriers comprise a plurality of subcarriers within a narrowband region of a wireless communications system bandwidth.

In some examples of the methods, apparatuses, and non-transitory computer-readable media described herein, a subcarrier spacing of adjacent subcarriers of the set of subcarriers corresponds to a same subcarrier spacing as used for data communications within the narrowband region of the wireless communications system bandwidth.

In some examples of the methods, apparatuses, and non-transitory computer-readable media described herein, the random access messages may be transmitted using a single subcarrier of the set of subcarriers.

In some examples of the methods, apparatuses, and non-transitory computer-readable media described herein, the random access messages and data communications may be time division multiplexed on one or more of the subcarriers.

Some examples of the methods, apparatuses, and non-transitory computer-readable media described herein may further include processes, features, means, or instructions for identifying a repetition level for transmitting redundant versions of a random access message for each coverage class of the set of coverage classes.

In some examples of the methods, apparatuses, and non-transitory computer-readable media described herein, the random access messages may be transmitted asynchronously. In some examples of the methods, apparatuses, and non-transitory computer-readable media described herein, the random access messages comprise a pilot signal and a payload.

In some examples of the methods, apparatuses, and non-transitory computer-readable media described herein, the payload comprises one or more of an identification of a random access type, a wireless device identity, an access cause, or a coverage class of the wireless device.

Some examples of the methods, apparatuses, and non-transitory computer-readable media described herein may further include processes, features, means, or instructions for selecting a subcarrier based at least in part on an identified coverage class. Some examples of the methods, apparatuses, and non-transitory computer-readable media described herein may further include processes, features, means, or instructions for transmitting a random access message using the selected subcarrier, wherein the random access request comprises a random identification number. Some examples of the methods, apparatuses, and non-transitory computer-readable media described herein may further include processes, features, means, or instructions for receiving an uplink resource allocation based at least in part on the random access message. Some examples of the methods, apparatuses, and non-transitory computer-readable media described herein may further include processes, features, means, or instructions for transmitting an uplink data packet based at least in part on the uplink resource allocation. Some examples of the methods, apparatuses, and non-transitory computer-readable media described herein may further include processes, features, means, or instructions for receiving feedback to acknowledge successful receipt of the uplink data packet.

Some examples of the methods, apparatuses, and non-transitory computer-readable media described herein may further include processes, features, means, or instructions for determining that additional uplink resources may be needed for transmission of uplink data. Some examples of the methods, apparatuses, and non-transitory computer-readable media described herein may further include processes, features, means, or instructions for transmitting a second random access message based at least in part on the determining, the second random access message comprising an identification provided for the wireless device by a base station. Some examples of the methods, apparatuses, and non-transitory computer-readable media described herein may further include processes, features, means, or instructions for receiving a second uplink resource allocation based at least in part on the second random access message. Some examples of the methods, apparatuses, and non-transitory computer-readable media described herein may further include processes, features, means, or instructions for transmitting a second uplink data packet based at least in part on the second uplink resource allocation.

Some examples of the methods, apparatuses, and non-transitory computer-readable media described herein may further include processes, features, means, or instructions for identifying a subcarrier of the set of subcarriers within a narrowband region of a wireless communications system bandwidth for transmitting a random access message. Some examples of the methods, apparatuses, and non-transitory computer-readable media described herein may further include processes, features, means, or instructions for identifying a payload to include in the random access message. Some examples of the methods, apparatuses, and non-transitory computer-readable media described herein may further include processes, features, means, or instructions for transmitting the random access message and payload using the identified subcarrier.

In some examples of the methods, apparatuses, and non-transitory computer-readable media described herein, the payload may be transmitted using a subset of subcarriers of the set of subcarriers.

Some examples of the methods, apparatuses, and non-transitory computer-readable media described herein may further include processes, features, means, or instructions for transmitting the payload on each subcarrier of the subset of subcarriers.

Some examples of the methods, apparatuses, and non-transitory computer-readable media described herein may further include processes, features, means, or instructions for dividing the payload into a plurality of portions. Some examples of the methods, apparatuses, and non-transitory computer-readable media described herein may further include processes, features, means, or instructions for generating redundancy portions from the payload. Some examples of the methods, apparatuses, and non-transitory computer-readable media described herein may further include processes, features, means, or instructions for transmitting a subset of the plurality of portions and a subset of redundancy portions on each subcarrier of the subset of subcarriers.

In some examples of the methods, apparatuses, and non-transitory computer-readable media described herein the characteristic of the communication link may be a pathloss of the communication link.

In some examples of the methods, apparatuses, and non-transitory computer-readable media described herein, the characteristic of the communication link may be one of a reference signal received power (RSRP), a reference signal received quality (RSRQ), or a received signal strength indicator (RSSI).

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
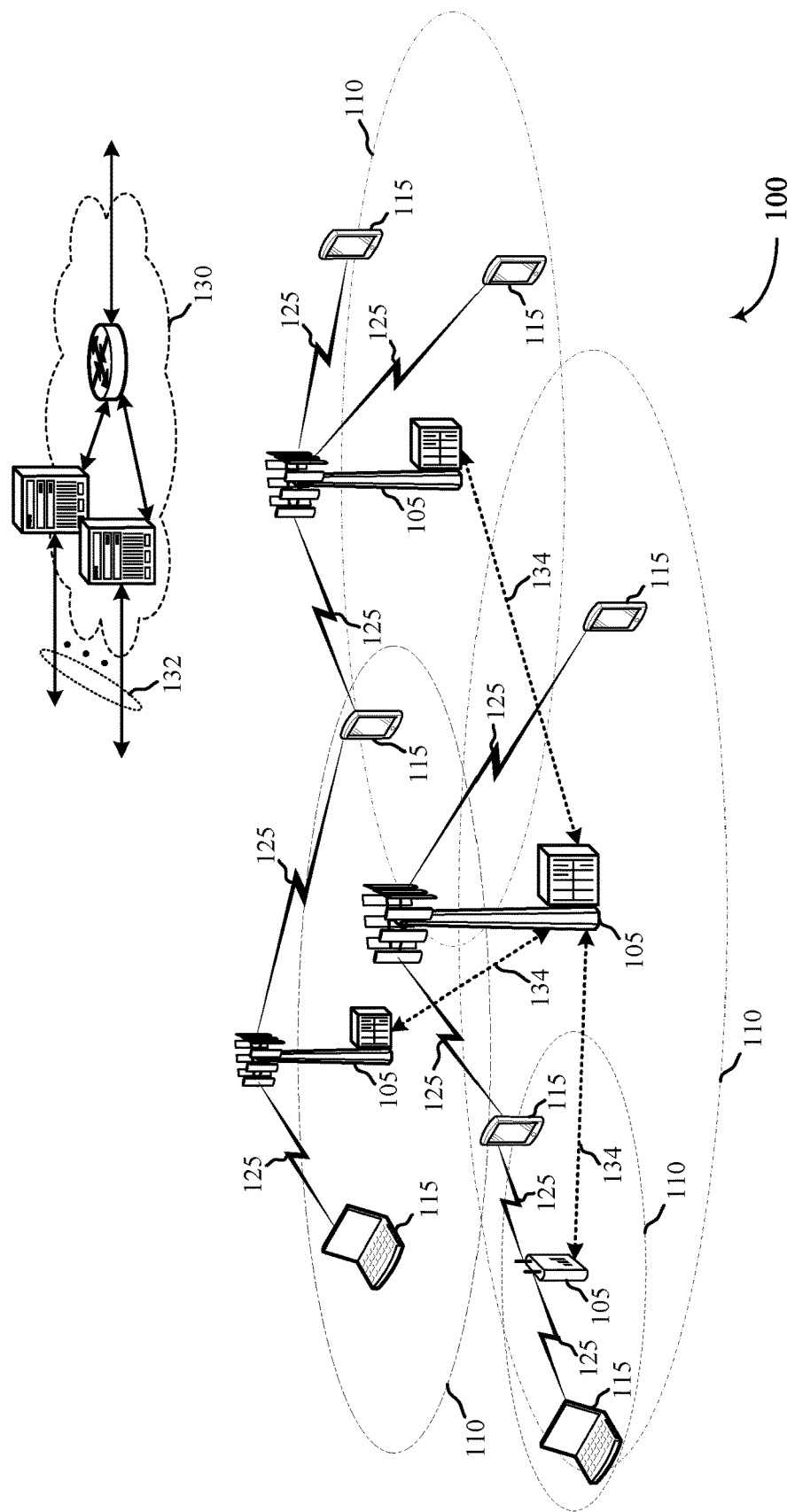
FIG. 1 illustrates an example of a wireless communications system that supports random access techniques for narrowband wireless communications in accordance with various aspects of the present disclosure.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

DETAILED DESCRIPTION

In some wireless communication systems, wireless devices may gain system access through transmission of a request for access via a set of resources, or channel, allocated for transmission of such requests. Such a request for access may be prompted by, for example, the wireless device initially accessing the system, a page received at the wireless device that indicates the device should gain system access, or the wireless device determining that data is present to be sent over the wireless communication system. In some examples, a wireless communication system may configure physical resources, such as a physical random access channel (PRACH) that a UE may use to initiate a random access procedure and transmit a random access request. According to various deployments of wireless communication systems, particular random access procedures may be provided. Because the channel provided for such transmissions may be a narrowband channel and have limited resources, efficient techniques for allocating and using resources of the channel may be desirable.

Techniques are described for random access message communication in a wireless communications system that may utilize a relatively narrowband region of a system operating frequency bandwidth. Such techniques may be used, for example, in Machine-to-Machine (M2M) communication or Machine Type Communication (MTC). In some cases, networks of MTC devices communicating to each other or one or more servers may be referred to as the Internet of Things (IoT). In instances where the communication is performed over a cellular network, this may be referred to as a Cellular IoT (CIoT). In some deployments, CIoT devices may communicate using a relatively small portion of allocated bandwidth of a cellular network, which may be referred to as narrowband communication. Other portions of the allocated bandwidth, or system bandwidth, of the cellular network may be used for communications that have higher data rates and are referred to as wideband communications herein. In some examples, the narrowband communications may occupy 200 kHz of a radio frequency spectrum band, as compared to a 1.4 MHz to 20 MHz system bandwidth.

In some deployments, CIoT devices may have a 164 dB Minimum Coupling Loss (MCL), which may be achieved through relatively high power spectral density (PSD). CIoT devices may have relatively high power efficiency demands, and CIoT networks may routinely support a relatively large number of devices (e.g., a relatively large number of water meters, gas meters, electric meters in a given area). CIoT devices may be designed to have a relatively low cost as well, and thus may have hardware components that are specifically designed to operate in a power efficient manner and that do not have a significant amount of processing capabilities beyond what is necessary for narrowband communications.

As mentioned above, in some deployments such MTC devices may operate with a 200 kHz channelization. In some deployments, CIoT devices may exhibit network access and data traffic patterns that involve more frequent network access than regular cellular users, network access that is likely to be event-driven and periodic, and data traffic on uplink transmissions that is dominant. Legacy random access design, however, may not be a good fit for CIoT access from relatively large numbers of MTC devices, and may result in congestion, overloading and fast energy depletion (which may be significant for MTC devices with non-replaceable or non-rechargeable batteries). Furthermore, certain legacy random access designs may under-utilize the channel capacity, and carry a preamble sequence. Additionally, MTC devices may be relatively low-cost UEs, and may incur larger time and frequency instability. Aspects of the present disclosure provide systems and techniques that address various of these considerations, as will be discussed in more detail below.

Various aspects of the disclosure provide random access techniques for narrowband communications. In some aspects, narrowband MTC communications may be transmitted using a single resource block (RB) of a number of RBs used for wideband Long Term Evolution (LTE) communications. Whether the narrowband region is stand-alone or contained within a wideband region, these factors may impact the design for random access for narrowband LTE. Further, the narrowband random access design may be tailored for compatibility with both a stand-alone narrowband region and a narrowband region within a legacy wideband region.

In order to provide for efficient use of physical resources and for efficient operation of MTC devices, which may use relatively low-cost components, aspects of the present disclosure provide allocation of physical resources of a narrowband bandwidth and techniques for random access. In some examples, a set of subcarriers may be allocated for a narrowband bandwidth and a subcarrier spacing of adjacent subcarriers may be selected to enable robust operation against frequency errors that may be incurred by relatively low-cost design components of MTC devices. In some examples, a 2.5 kHz subcarrier spacing is provided for the narrowband region. In certain examples, a same set of physical resources may be used for random access messages as is used for data communications.

A base station may, for example, time division multiplex a subcarrier to allocate resources to random access messages and data communications. The number of MTC devices may be configured to transmit random access messages using different subcarriers based on a coverage class of the MTC device. The coverage class of the MTC device may be based at least in part on a characteristic of a communication link associated with the MTC device. Such configurations may reduce a number of potential collisions of random access messages transmitted by different MTC devices through reducing the number of MTC devices that will transmit on a given subcarrier. Further, in some examples, a base station may identify a token associated with a coverage class, and a MTC device may determine a random number prior to transmitting a random access request. If the random number generated by the MTC device corresponds to the token for the coverage class, the MTC device may transmit the random access message, and otherwise the random access message will be deferred. Thus, a number of collisions between different MTC devices attempting to transmit a random access message may be further reduced.

In some examples, random access messages may be transmitted asynchronously using identified physical resources, thus allowing for message transmission that does not require closed-loop power control or timing advance information prior to transmission. In some examples, transmissions in the narrowband bandwidth may have a constant envelope modulation per subcarrier, which may be suitable for relatively low-cost power amplifier (PA) design for MTC devices. In some examples, when a MTC device performs random access, the estimated downlink coverage class of the MTC device may be included in the random access message to notify the base station. Additionally, an identity of the MTC device may be provided to the base station within a payload of the random access message. Such an identity may be obtained in an initial network access as a random number, or may be a cell-radio network temporary identifier (C-RNTI) value provided by a base station to the MTC device from a prior access procedure.

Aspects of the disclosure are initially described in the context of a wireless communication system. Specific examples are then described for narrowband MTC communications in an LTE system. These and other aspects of the disclosure are further illustrated by and described with reference to apparatus diagrams, system diagrams, and flowcharts that relate to downlink and synchronization techniques for narrowband wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

As mentioned above, some types of wireless devices may provide for automated communication. Automated wireless devices may include those implementing M2M communication or MTC. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, smart switches, inventory monitoring, water level monitoring, equipment monitoring, healthcare monitoring, wildlife monitoring, weather and geological event monitoring, fleet management and tracking, remote security sensing, physical access control, and transaction-based business charging, to name but a few examples. An MTC device may operate using half-duplex (one-way) communications at a reduced peak rate. MTC devices may also be configured to enter a power saving "deep sleep" mode when not engaging in active communications. According to various aspects of the present disclosure, MTC devices may operate using narrowband communications that may be located within a bandwidth of other wideband communications or outside of the bandwidth of other wideband communications.

Legacy LTE systems may utilize OFDMA on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands. As mentioned above, in examples that provide MTC communications using narrowband resources, corresponding narrowband bandwidth may be 200 kHz, which may include 180 kHz of subcarriers and a 20 kHz guard band. In such examples, the narrowband communications may occupy a single RB of an LTE system bandwidth, and there may be 12 sub-carriers.

As mentioned above, various aspects of the disclosure provide a set of subcarriers that may be allocated for a narrowband bandwidth. A subcarrier spacing of adjacent subcarriers may be selected to enable robust operation against frequency errors that may be incurred by relatively low-cost design components of MTC devices. In some examples, a 2.5 kHz subcarrier spacing is provided for the narrowband region. In certain examples, a same set of physical resources may be used for random access messages as is used for data communications. A base station may, for example, time division multiplex a subcarrier to allocate resources to random access messages and data communications. The number of MTC devices may be configured to transmit random access messages using different subcarriers based on a coverage class of the MTC device. The coverage class of the MTC device may be based at least in part on a characteristic of a communication link associated with the MTC device. Such configurations may reduce a number of potential collisions of random access messages transmitted by different MTC devices through reducing the number of MTC devices that will transmit on a given subcarrier.

Further, in some examples, a base station may identify a token associated with a coverage class, and a MTC device may determine a random number prior to transmitting a random access request. If the random number generated by the MTC device corresponds to the token for the coverage class, the MTC device may transmit the random access message, and otherwise the random access message will be deferred. Thus, a number of collisions between different MTC devices attempting to transmit a random access message may be further reduced.

In some examples, random access messages may be transmitted asynchronously using identified physical resources, thus allowing for message transmission that does not require closed-loop power control or timing advance information prior to transmission. In some examples, transmissions in the narrowband bandwidth may have a constant envelope modulation per subcarrier, which may be suitable for relatively low-cost power amplifier (PA) design for MTC devices. In some examples, when a MTC device performs random access, the estimated downlink coverage class of the MTC device may be included in the random access message to notify the base station. Additionally, an identity of the MTC device may be provided to the base station within a payload of the random access message. Such an identity may be obtained in an initial network access as a random number, or may be a cell-radio network temporary identifier (C-RNTI) value provided by a base station to the MTC device from a prior access procedure.

Figure 2:
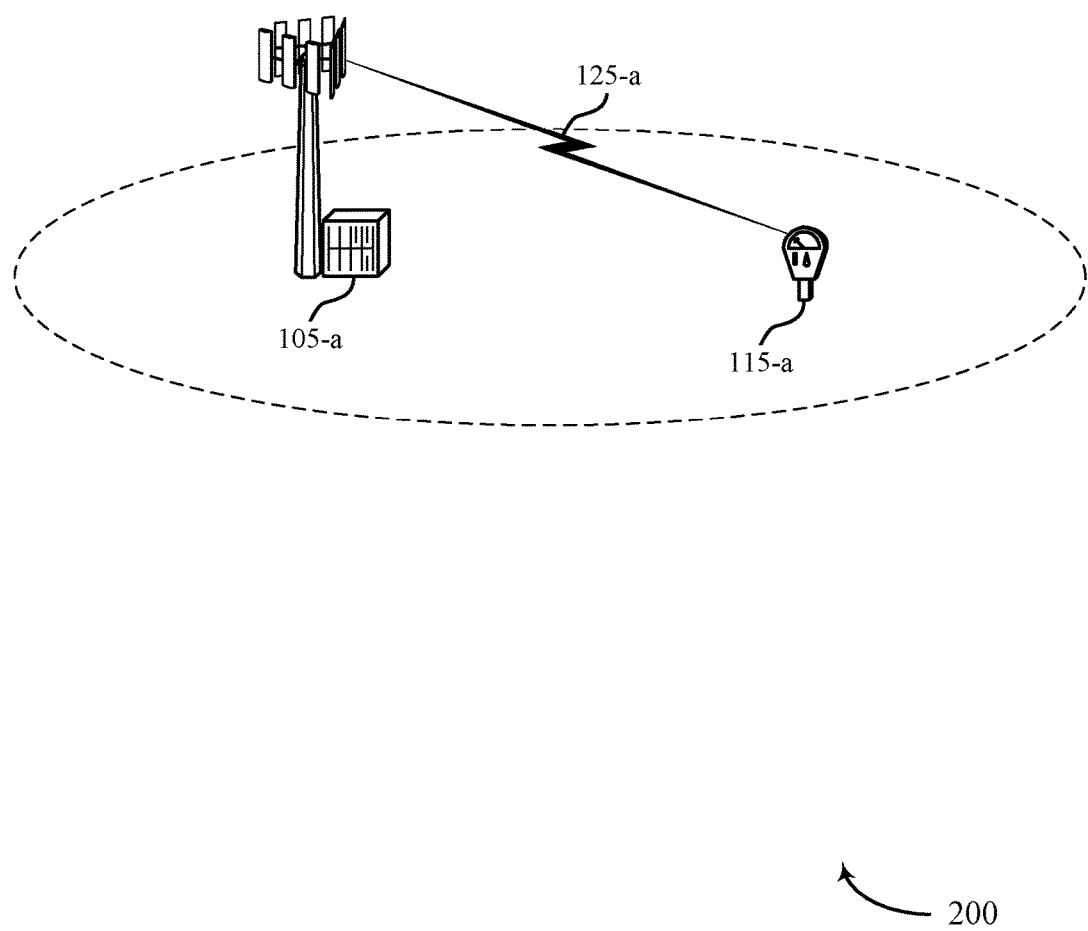
FIG. 2 illustrates an example of a wireless communications system that supports random access techniques for narrowband wireless communications in accordance with various aspects of the present disclosure.

FIG. 2 illustrates an example of a wireless communications system 200 for downlink and synchronization techniques for narrowband wireless communications in accordance with various aspects of the present disclosure. Wireless communications system 200 may include a UE 115-*a* and base station 105-*a*, which may be examples of a UE 115 base station 105 described with reference to FIG. 1.

In some examples, UE 115-*a* is an MTC device, such as a smart meter, that may communicate with base station 105-*a* using narrowband communication link 125-*a*. In order to configure random access communications, base station 105-*a* may allocate a set of subcarriers that for a narrowband bandwidth. A subcarrier spacing of adjacent subcarriers may be selected to enable robust operation against frequency errors that may be incurred by relatively low-cost design components of MTC devices. In some examples, a 2.5 kHz subcarrier spacing is provided for the narrowband region. In certain examples, a same set of physical resources may be used for random access messages as is used for data communications. A base station may, for example, time division multiplex a subcarrier to allocate resources to random access messages and data communications. The number of MTC devices may be configured to transmit random access messages using different subcarriers based on a coverage class of the MTC device. The coverage class of the MTC device may be based at least in part on a characteristic of a communication link associated with the MTC device. Such configurations may reduce a number of potential collisions of random access messages transmitted by different MTC devices through reducing the number of MTC devices that will transmit on a given subcarrier. Further, in some examples, a base station may identify a token associated with a coverage class, and a MTC device may determine a random number prior to transmitting a random access request. If the random number generated by the MTC device corresponds to the token for the coverage class, the MTC device may transmit the random access message, and otherwise the random access message will be deferred. Thus, a number of collisions between different MTC devices attempting to transmit a random access message may be further reduced.

In some examples, random access messages may be transmitted asynchronously using identified physical resources, thus allowing for message transmission that does not require closed-loop power control or timing advance information prior to transmission. In some examples, transmissions in the narrowband bandwidth may have a constant envelope modulation per subcarrier, which may be suitable for relatively low-cost power amplifier (PA) design for MTC devices. In some examples, when a MTC device performs random access, the estimated downlink coverage class of the MTC device may be included in the random access message to notify the base station. Additionally, an identity of the MTC device may be provided to the base station within a payload of the random access message. Such an identity may be obtained in an initial network access as a random number, or may be a cell-radio network temporary identifier (C-RNTI) value provided by a base station to the MTC device from a prior access procedure.

Figure 3:
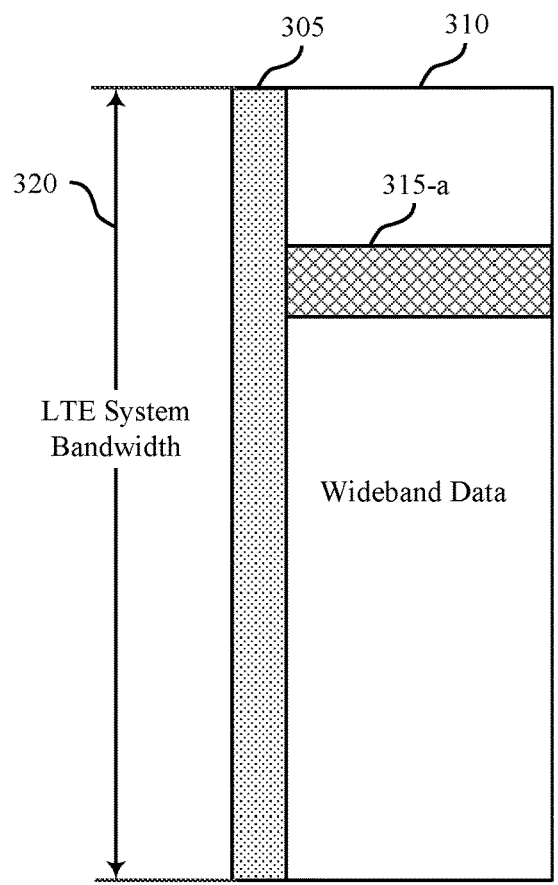
FIG. 3 illustrates an example of a narrowband region within a transmission bandwidth of a wideband transmission and a narrowband region in another allocated frequency band that support random access techniques for narrowband wireless communications, in accordance with various aspects of the present disclosure.
Figure 3:
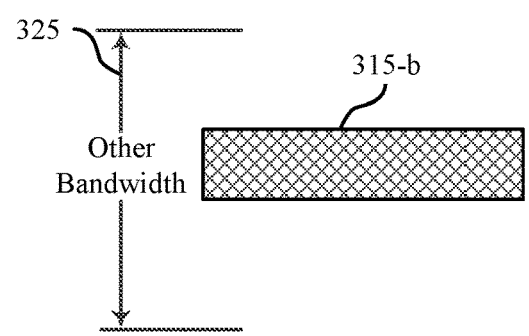

FIG. 3 illustrates an example 300 of a narrowband region within a transmission bandwidth of a wideband transmission and a narrowband region in another allocated frequency band support downlink and synchronization techniques for narrowband wireless communications, in accordance with various aspects of the present disclosure. Example 300 may be used by wireless network devices, such as UEs 115 and base stations 105 described with reference to FIGS. 1-2 that may operate using narrowband communications.

In the example of FIG. 3, LTE system bandwidth 320 may include control region 305, a wideband data region 310, and first narrowband region 315-*a*. A second narrowband region 315-*b* may be provided for standalone narrowband communications, and may be located in some other bandwidth 325, such as a bandwidth allocated for GSM communications, for example.

In some examples, first narrowband region 315-*a* and second narrowband region 315-*b* may occupy a single RB (e.g., 12 subcarriers) of wideband data region 510. In one example, (e.g., for a 20 MHz carrier) wideband data region 310 may include 100 RBs (e.g., 1200 subcarriers). The particular narrowband region 315-*a* or 315-*b* may be configured for narrowband communications based on various deployment parameters, and may enable random access messages based on coverage classes of MTC devices. The coverage classes of the MTC devices may be based at least in part on a characteristic of a communication link associated with the MTC devices. For example, the characteristic of the communication link may be a pathloss of the communication link, a reference signal received power (RSRP) of the communication link, a reference signal received quality (RSRQ) of the communication link, or a received signal strength indicator (RSSI) of the communication link. In some examples, a base station may provide an indication to UEs of a set of subcarriers that may be allocated for the narrowband region 315. In some examples, a 2.5 kHz subcarrier spacing is provided for the narrowband regions 315. In certain examples, a same set of physical resources may be used for random access messages as is used for data communications.

A base station may, for example, time division multiplex a subcarrier to allocate resources to random access messages and data communications. The number of MTC devices may be configured to transmit random access messages using different subcarriers based on a coverage class of the MTC device. The coverage class of the MTC device may be based at least in part on a characteristic of a communication link associated with the MTC device. Such configurations may reduce a number of potential collisions of random access messages transmitted by different MTC devices through reducing the number of MTC devices that will transmit on a given subcarrier. Further, in some examples, a base station may identify a token associated with a coverage class, and a MTC device may determine a random number prior to transmitting a random access request. If the random number generated by the MTC device corresponds to the token for the coverage class, the MTC device may transmit the random access message, and otherwise the random access message will be deferred. Thus, a number of collisions between different MTC devices attempting to transmit a random access message may be further reduced.

In some examples, random access messages may be transmitted asynchronously using identified physical resources, thus allowing for message transmission that does not require closed-loop power control or timing advance information prior to transmission. In some examples, transmissions in the narrowband bandwidth may have a constant envelope modulation per subcarrier, which may be suitable for relatively low-cost power amplifier (PA) design for MTC devices. In some examples, when a MTC device performs random access, the estimated downlink coverage class of the MTC device may be included in the random access message to notify the base station. Additionally, an identity of the MTC device may be provided to the base station within a payload of the random access message. Such an identity may be obtained in an initial network access as a random number, or may be a cell-radio network temporary identifier (C-RNTI) value provided by a base station to the MTC device from a prior access procedure.

Figure 4:
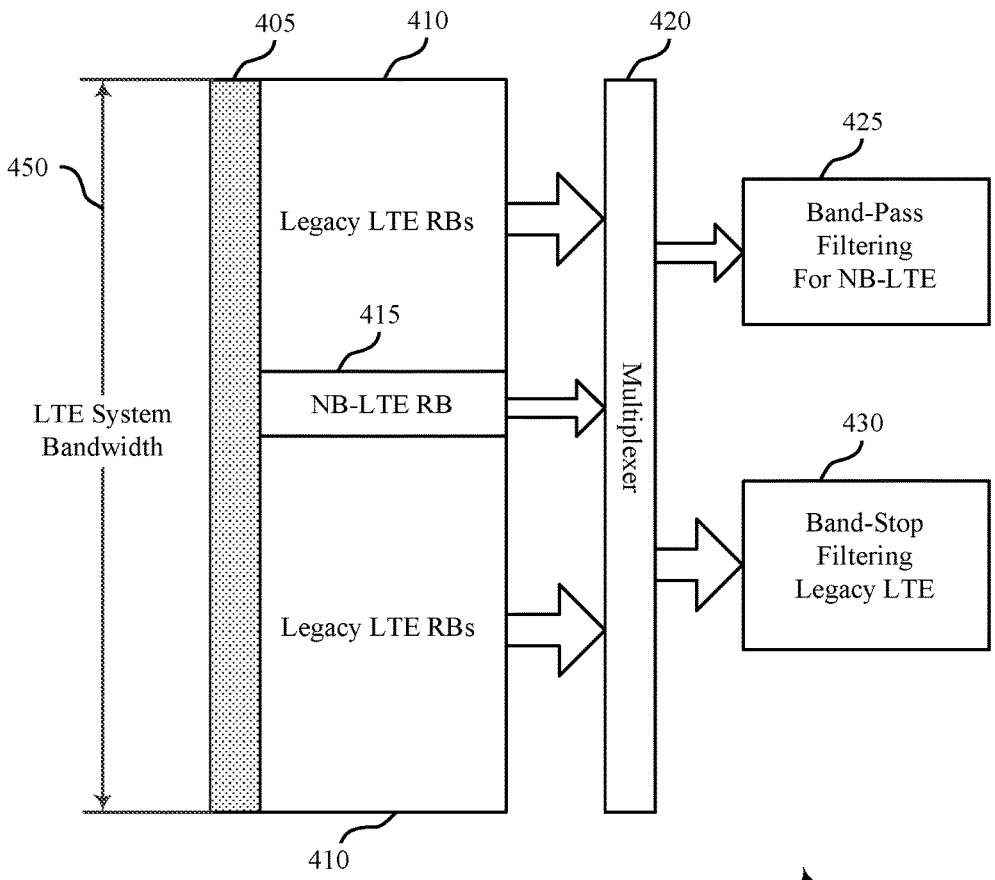
FIG. 4 illustrates an example of narrowband and wideband resource blocks that may be multiplexed in a system bandwidth and filtered at receiving devices, in accordance with various aspects of the present disclosure.

FIG. 4 illustrates an example 400 of narrowband and wideband resource blocks that may be multiplexed in a system bandwidth and filtered at receiving devices, in accordance with various aspects of the present disclosure. Example 400 may be used by wireless network devices, such as UEs 115 and base stations 105 described with reference to FIGS. 1-2 that may operate using narrowband communications.

In the example of FIG. 4, LTE system bandwidth 450 may include control region 405, a wideband data region for transmission of legacy LTE RBs 410, and a narrowband LTE region 415. The legacy LTE RBs 410 and NB LTE region 415 (i.e., NB LTE RBs) may be multiplexed at multiplexer 420. Such multiplexing may allow the NB LTE region 415 to be effectively treated separately as a stand-alone narrowband channel. A receiving device may use filtering to filter the RBs of interest for the particular device. For example, a narrowband UE, such as an MTC device, may use bandpass filtering 425 to filter out the legacy LTE RBs 410 and provide the NB LTE region 415 to the device. Similarly, a legacy LTE device may use band-stop filtering 430 to provide the legacy LTE RBs 410 to the device.

Figure 5:
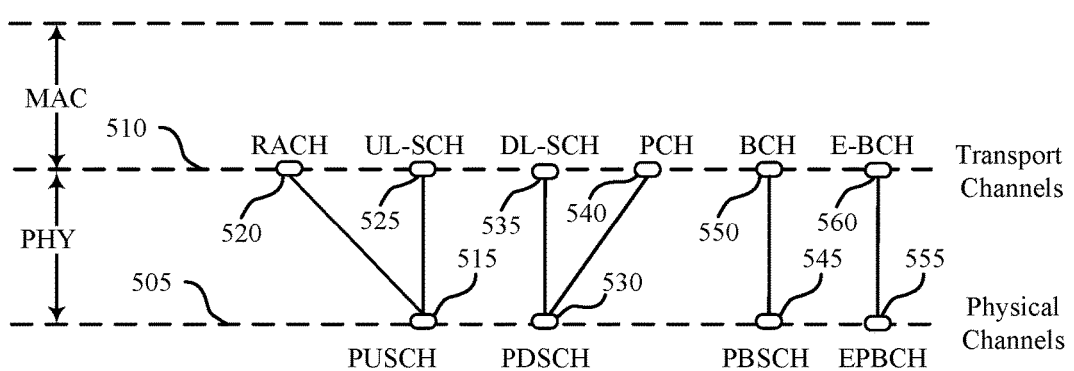
FIG. 5 illustrates an example channel structure that support random access techniques for narrowband wireless communications, in accordance with various aspects of the present disclosure.

FIG. 5 illustrates an example channel structure 500 that supports random access techniques for narrowband wireless communications, in accordance with various aspects of the present disclosure. Channel structure 500 may be used by wireless network devices, such as UEs 115 and base stations 105 described with reference to FIGS. 1-2 that may operate using narrowband communications.

In the example of FIG. 5, physical channels 505 may be present at a physical layer that may be mapped to transport channels 510 at a Medium Access Control (MAC) layer. In some examples, a physical uplink shared channel (PUSCH) 515 may be mapped to both a random access channel (RACH) 520 and an uplink shared channel (UL-SCH) 525 transport channels. In legacy LTE, random access messages are communicated using a dedicated physical random access channel (PRACH), while examples described herein may multiplex random access communications with other uplink communications using PUSCH 515. Other physical channels may include a physical downlink shared channel (PDSCH) 530, which may be mapped to a downlink shared channel (DL-SCH) 535 and a paging channel (PCH) 540. A physical broadcast shared channel (PBSCH) 545 may be mapped to a broadcast channel (BCH) 550, and an enhanced PBCH (ePBCH) 555 may be mapped to an enhanced BCH 560.

In some examples, narrowband resources may be allocated to provide reserved resources for random access messages using the PUSCH 515. Various techniques may provide allocated resources for random access messages that may fulfill the functions of legacy PRACH of LTE, reduce congestion and overloading of random accesses using low-cost design, multiplex timing and user-specific information, and at least partially replace the function of the legacy physical uplink control channel (PUCCH). As mentioned above, in some examples certain subcarriers may be allocated for random access messages of UEs with certain coverage classes. Such allocations may, in some examples, be dynamically configured, and a UE may adapt RACH resource selection based on DL broadcast information. In such a manner, a base station may balance opportunities for random access and data transmission.

In some examples, a random access message may be transmitted using a single subcarrier, which may enhance a power spectral density (PSD) of the random access message and facilitate better detection by a base station. In some examples, the symbol rate per sub-channel may be 1800 symbols/second, and a time duration of a single RACH slot may be set to 80 ms, with the option for a base station (or other network entity) to provide RACH slot repetitions to provide coverage enhancements and allow a base station to combine multiple redundant transmissions and improve a signal to noise ratio.

Furthermore, as discussed above, in some examples random access messages may be transmitted asynchronously, which may provide that a UE does not need to be provided with timing advance information prior to transmitting a random access request. In order to facilitate the reception of such asynchronous transmissions at a base station, a pilot signal may be generated and included with a random access message, which may be used for synchronization at a base station. In some examples, the pilot signal may be a length-13 Barker code, or other short binary sequence with good auto-correlation properties.

Also as mentioned above, in some examples a random access message may include a payload. Such a payload may be, in some examples, an 8 byte payload (e.g., a maximum number of bytes of payload size assuming ½ code rate for FEC:

$$L=\lfloor (18*8-13)/2 \rfloor = 65).$$

Figure 6:
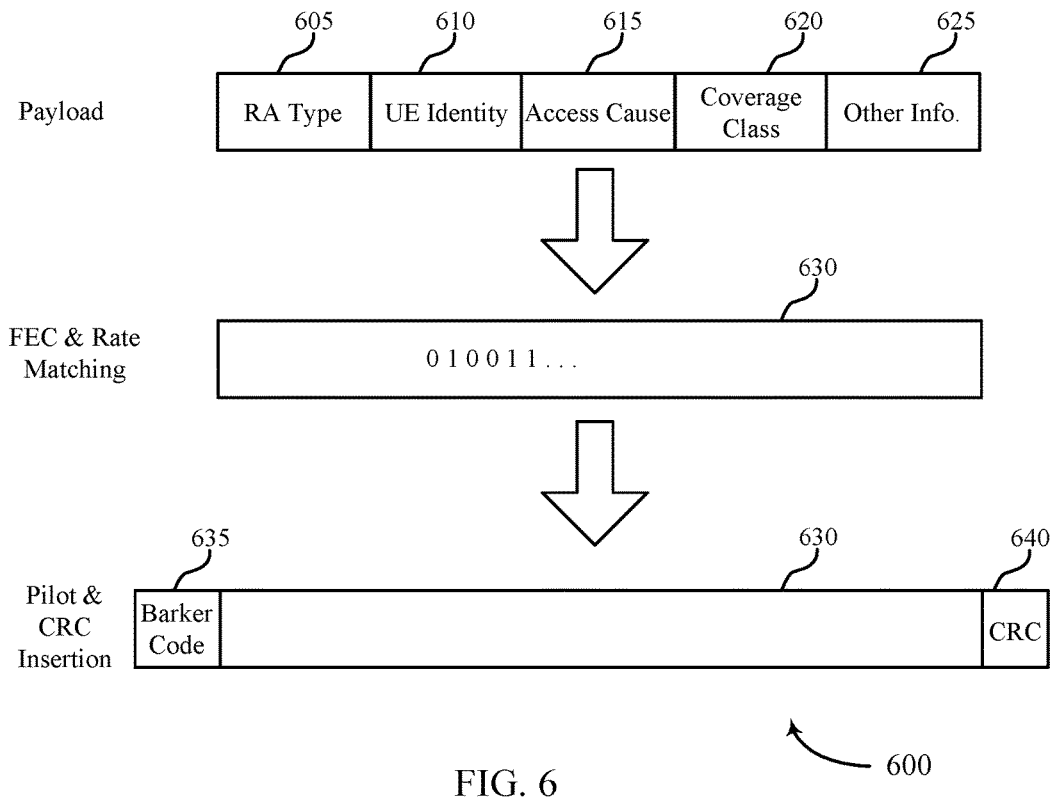
FIG. 6 illustrates an example of random access message payload and data processing for random access message transmission, in accordance with various aspects of the present disclosure.

FIG. 6 illustrates an example 600 of random access message payload and data processing for random access message transmission, in accordance with various aspects of the present disclosure. Example 600 may be used by wireless network devices, such as UEs 115 and base stations 105 described with reference to FIGS. 1-2 that may operate using narrowband communications.

In the example of FIG. 6, a payload may include a number of information fields, including a random access type field 605, a UE identify field 610, an access cause field 615, a coverage class field 620, and other information 625. The random access type field may include information on the type of random access message that is being transmitted, which may allow a base station to decode other information that may be included in the payload. The UE identity field may include an identification of the UE. In some examples, in an initial random access message a UE may generate a random number that is used as the UE identity until a radio network temporary identifier (RNTI) is provided for the UE, with such a RNTI used at UE identity field 610 for subsequent random access messages transmitted to a same base station. The access cause 615 may include information about why the UE is transmitting the random access message (e.g., a type of event that may cause an event-based random access message). The coverage class field 620 may be information provided by the UE related to channel conditions or a coverage class determined by the UE for transmissions, which may be used as a factor in determining coverage enhancements that are to be used for subsequent communications (e.g., power boosting or a number of redundant transmissions to be used in communications). In some examples, channel conditions may be determined using a pathloss of a communication link on a subcarrier, a reference signal received power (RSRP) of the communication link, a reference signal received quality (RSRQ) of the communication link, or a received signal strength indicator (RSSI) of the communication link. Other information 625 may include one or more pieces of other information associated with the UE, such as, for example, data associated with a reading at the UE or event that prompted the random access message).

Once the payload is determined for a random access message, a UE may generate a forward error correction (FEC) and rate matched data string 630. The FEC and rate-matched data string 630 may be provided with a pilot code (e.g., length 13 Barker code), and an optional cyclic redundancy check (CRC), and then transmitted as a random access request.

Figure 7:
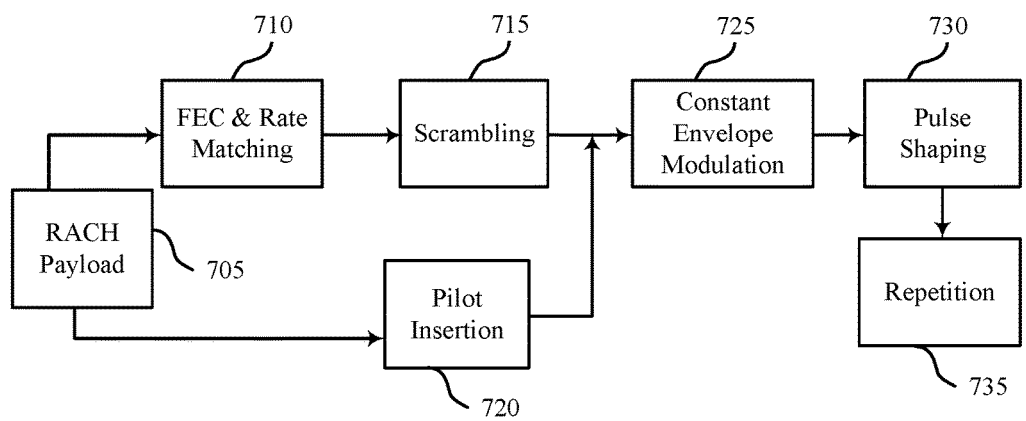
FIG. 7 illustrates an example transmission chain processing that supports random access techniques for narrowband wireless communications, in accordance with various aspects of the present disclosure.

FIG. 7 illustrates an example 700 of payload processing that supports random access techniques for narrowband wireless communications, in accordance with various aspects of the present disclosure. Example 700 may be used by wireless network devices, such as UEs 115 described with reference to FIGS. 1-2 that may operate using narrowband communications.

In the example, of FIG. 7, RACH payload 705 may be provided for FEC and rate matching 710, and also for pilot insertion 720. The FEC and rate matched data may be provided to a scrambling function 715, with the output having a pilot signal inserted and provided to a constant envelope modulation process 725. The output from the constant envelope modulation may be provided to pulse shaping block 730, and then to repetition block 735 that may provide multiple redundant versions of the output data for transmission based on a coverage class of the UE.

Figure 8:
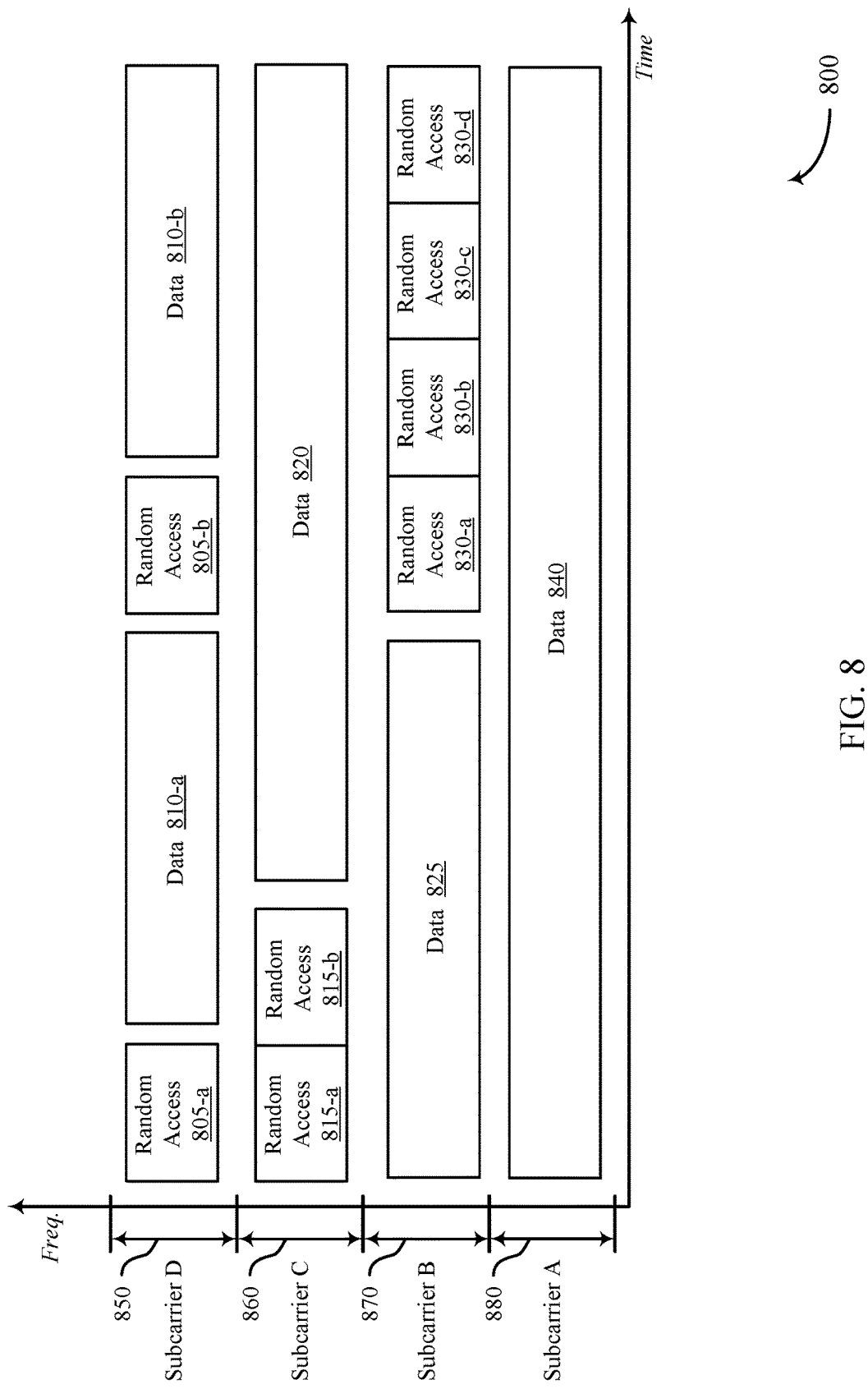
FIG. 8 illustrates an example of resource allocations for a set of subcarriers that support random access techniques for narrowband wireless communications, in accordance with various aspects of the present disclosure.

As discussed above, different subcarriers may be allocated for random access messages for UEs having different coverage classes. FIG. 8 illustrates an example of resource allocations 800 for a set of subcarriers that support random access techniques for narrowband wireless communications, in accordance with various aspects of the present disclosure.

Resource allocations 800 may be used by wireless network devices, such as UEs 115 and base stations 105 described with reference to FIGS. 1-2 that may operate using narrowband communications.

In this example, four subcarriers are illustrated that may have different coverage classes, namely subcarrier A 880, subcarrier B 870, subcarrier C 860, and subcarrier D 850. Each subcarrier 880, 870, 860, 850 may include characteristics that define the subcarrier. For example, characteristics of the subcarriers may include pathloss, RSRP, RSRQ, or RSSI. Subcarrier A may be allocated such that random access messages are not transmitted using this subcarrier, and the entire amount of resources for subcarrier A 880 may be dedicated to data transmissions 840. Subcarrier B 870 may be associated with a coverage class that has a relatively large pathloss as measured at a UE. In order to provide enhanced likelihood of successful transmissions from such UEs that have relatively poor channel conditions, a random access format with four repetitions of random access messages may be provided. In the example of FIG. 8, subcarrier B 870 may include allocations for data transmissions 825 that are time division multiplexed with random access message allocations 830, which may include four repetitions of random access message allocations 830-a through 830-d of a random access message. Subcarrier C 860 may be associated with a coverage class that has a medium amount of pathloss as measured at a UE, relative to other UEs that are served. Subcarrier C 860 may include allocations for data transmissions 820 that are time division multiplexed with random access message allocations 815, which may include two repetitions of random access message allocations 815-a and 815-b of a random access message. Similarly, subcarrier D 850 may be associated with a coverage class that has a relatively small amount of pathloss as measured at a UE, relative to other UEs that are served. Subcarrier D 850 may include allocations for data transmissions 810 that are time division multiplexed with random access message allocations 805, which may include a single transmission of random access message allocation 805. In the example, of FIG. 8, two slots may be provided that may each include an associated random access allocation 805-a and 805-b, as well as data transmissions 810-a and 810-b, which may also be referred to as allocations.

Accordingly, subcarriers 850-880 may be classified into different coverage classes, in which type B, C and D are allowed to transmit random access messages with 4, 2 and 1 repetitions, respectively, and in which type A is used for data transmissions. In some examples, a base station may reallocate resources based on conditions experienced at the base station and by UEs served by the base station. For example, subcarrier A may be reconfigured to provide random access message transmission by UEs of one or more coverage classes if additional random access requests are needed for a particular period of time. In some examples, a base station may signal resource allocations 800 to UEs that are being served by the base station (e.g., in a system information block (SIB)), and the allocations may be updated periodically.

In some examples, a base station may provide a token for one or more of the coverage classes or one or more of the subcarriers, and a UE may transmit a random access message if a token at the UE corresponds to the signaled token. In such a manner, a base station may reduce random access collisions within a coverage class or within a subcarrier. For example, a token may be value provided by the base station, and a UE may generate a random number prior to transmitting a random access message. If the random number generated by the UE is less than the token value, the UE may transmit the random access message, and otherwise the UE defers the transmission until a subsequent random access message transmission opportunity. In some examples, the random number generated by the UE may be modified based on one or more of an access history of the UE or downlink timing information, for example.

A UE may thus measure its pathloss, such as from a downlink reference signal received power (RSRP) measurement, and calculate its random access number (optionally based on access history and DL timing information). Based on the random access number and token number provided by the base station, the UE with a random access may determine whether it is allowed to transmit on subcarriers matching its coverage class. If so, the UE may transmit pilot and payload; otherwise, the UE may withhold its random access request and wait for next random access message transmission opportunity.

Figure 9:
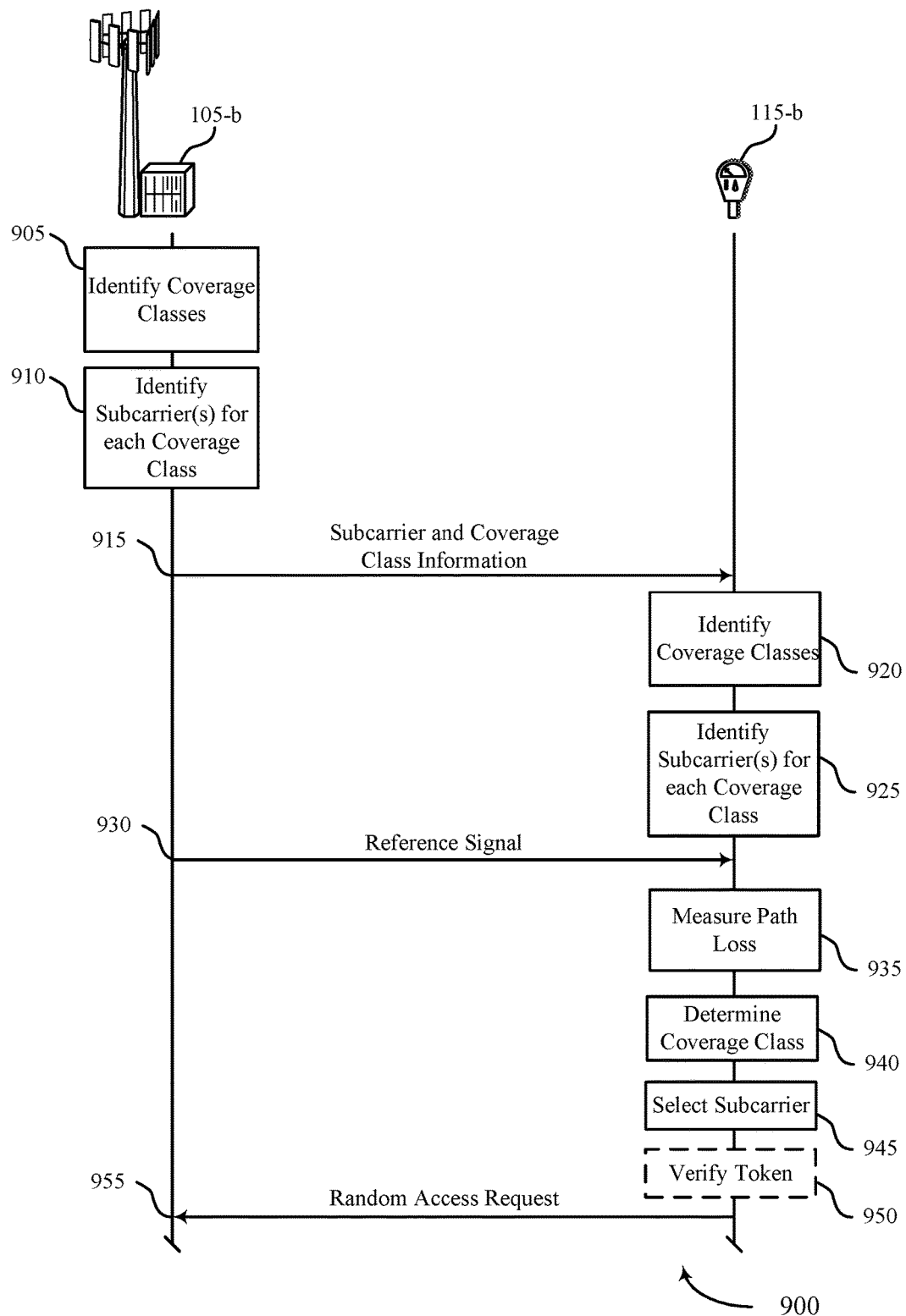
FIGS. 9-11 illustrate examples of process flows that support random access techniques for narrowband wireless communications in accordance with various aspects of the present disclosure.

FIG. 9 illustrates an example of a process flow 900 for random access channel design for narrowband wireless communication in accordance with various aspects of the present disclosure. Process flow 900 may include base station 105-b and UE 115-b, which may be examples of the corresponding devices described with reference to FIGS. 1-2.

At block 905, the base station 105-b may identify coverage classes. Such coverage classes may be identified, for example, based on measurements of characteristics of communication links provided by UEs 115 served by the base station 105-b, and may be determined based on numbers of UE 115 that have different channel conditions and an amount of coverage enhancements (e.g., power boosting or transmission repetition) that may be needed by different UEs. In some examples, the characteristics of the communication links may include pathloss, RSRP, RSRQ, or RSSI. At block 910, the base station 105-b may identify one or more subcarriers for each coverage class. As discussed above, a base station 105-b may allocate a subcarrier for random access transmissions for UEs in a particular access class, along with repetition levels for the different coverage levels. Furthermore, in some examples, the identification of subcarriers may also include providing a token that may also be used for determination by a UE of whether a random access message may be sent, as discussed above.

The base station 105-b may than transmit subcarrier and coverage class information 915. Such information may be provided, for example, in a SIB transmitted by base station 105-b. The UE 115-b, at block 920, may identify available coverage classes based at least in part on the subcarrier and coverage class information 915. The UE 115-b, at block 925, may identify a subcarrier (or subcarriers) for each coverage class that may be used for random access messages. The base station 105-b may transmit a reference signal 930, such as a CRS, for example, that may be received at UE 115-b and that may be used to measure pathloss at the UE, as indicated at block 935. Based at least in part on the measured pathloss, the UE 115-b may determine its coverage class, as indicated at block 940. At block 945, the UE 115-b may select a subcarrier for a random access message, in a manner similarly as discussed above. At optional block 950, the UE may verify a toked (e.g., through random number generation and verification against a token associated with a coverage class or subcarrier). The UE 115-b may then transmit random access request 955 using the selected subcarrier.

Figure 10:
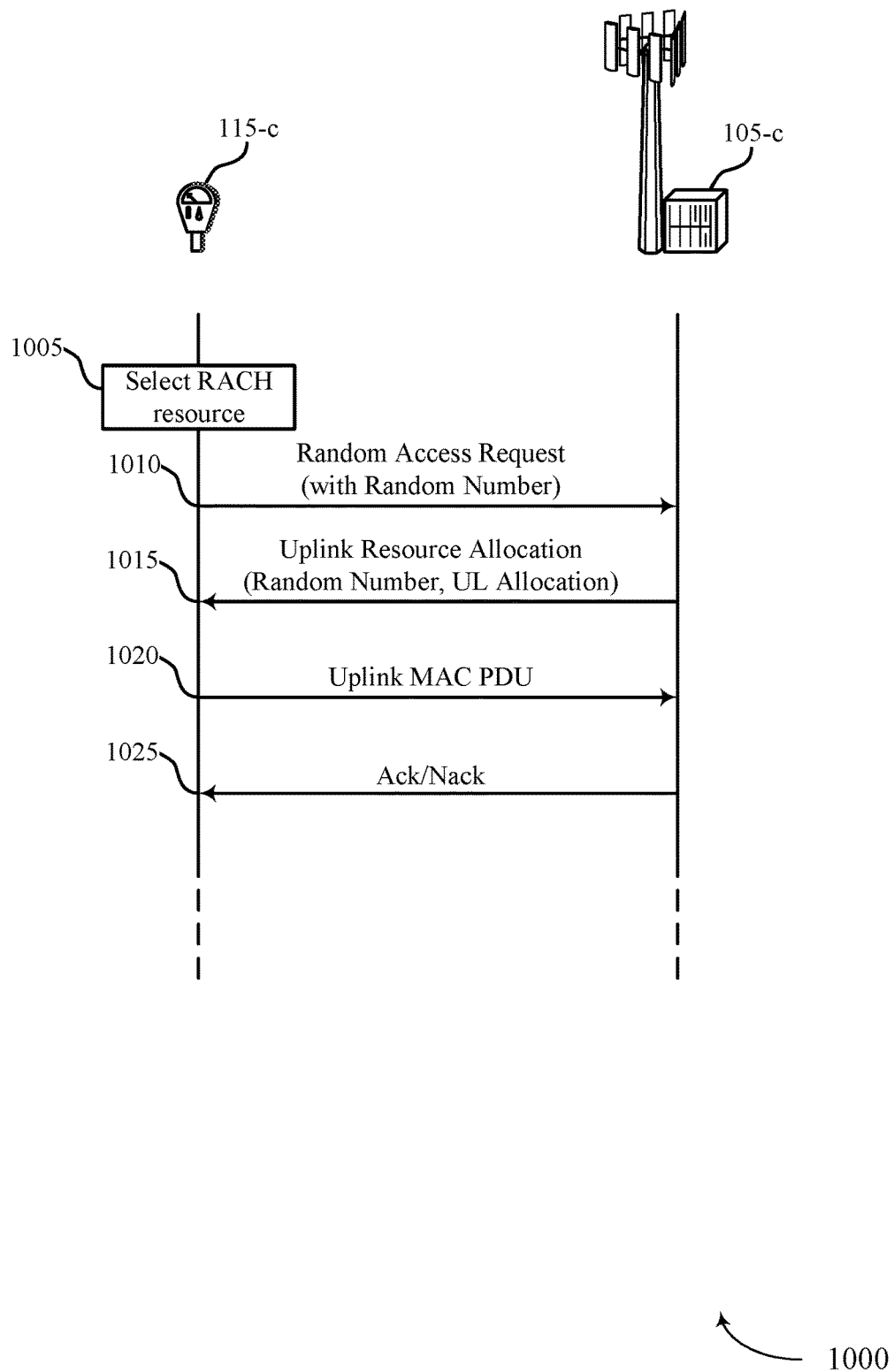

FIG. 10 illustrates an example of a process flow 1000 for random access channel design for narrowband wireless communication in accordance with various aspects of the present disclosure. Process flow 1000 may include base station 105-c and UE 115-c, which may be examples of the corresponding devices described with reference to FIG. 1-2 or 9.

At block 1005, the UE 115-c may select a random access resource. Such a random access resource selection may be made according to techniques as discussed above, for example. The UE 115-c may transmit a random access request 1010, which may include a random number, for example, as a UE identification, in a manner similarly as discussed above. The base station 105-c, in response to the random access request 1010, may transmit an uplink resource allocation 1015 to the UE 115-c. The uplink resource allocation 1015 may include, for example, the random number identification provided by the UE 115-c in the random access request 1010, which may be used by the UE 115-c to confirm that the uplink resource allocation 1015 was intended for UE 115-c. The uplink resource allocation 1015 also may include an allocation of uplink resources that may be used by the UE 115-c for uplink transmissions. The UE 115-c may transmit an uplink MAC PDU 1020 to the base station 105-c. The base station 105-c may transmit feedback in the form of an ACK/NACK 1025 to the UE 115-c to confirm the successful receipt of the uplink MAC PDU 1020. Such a process flow 1000 may be used, for example, for initial access to a base station 105-c or during tracking area update procedures, when UE 115-c undergoes a state transition from "RRC_IDLE" to "RRC_Connected."

Figure 11:
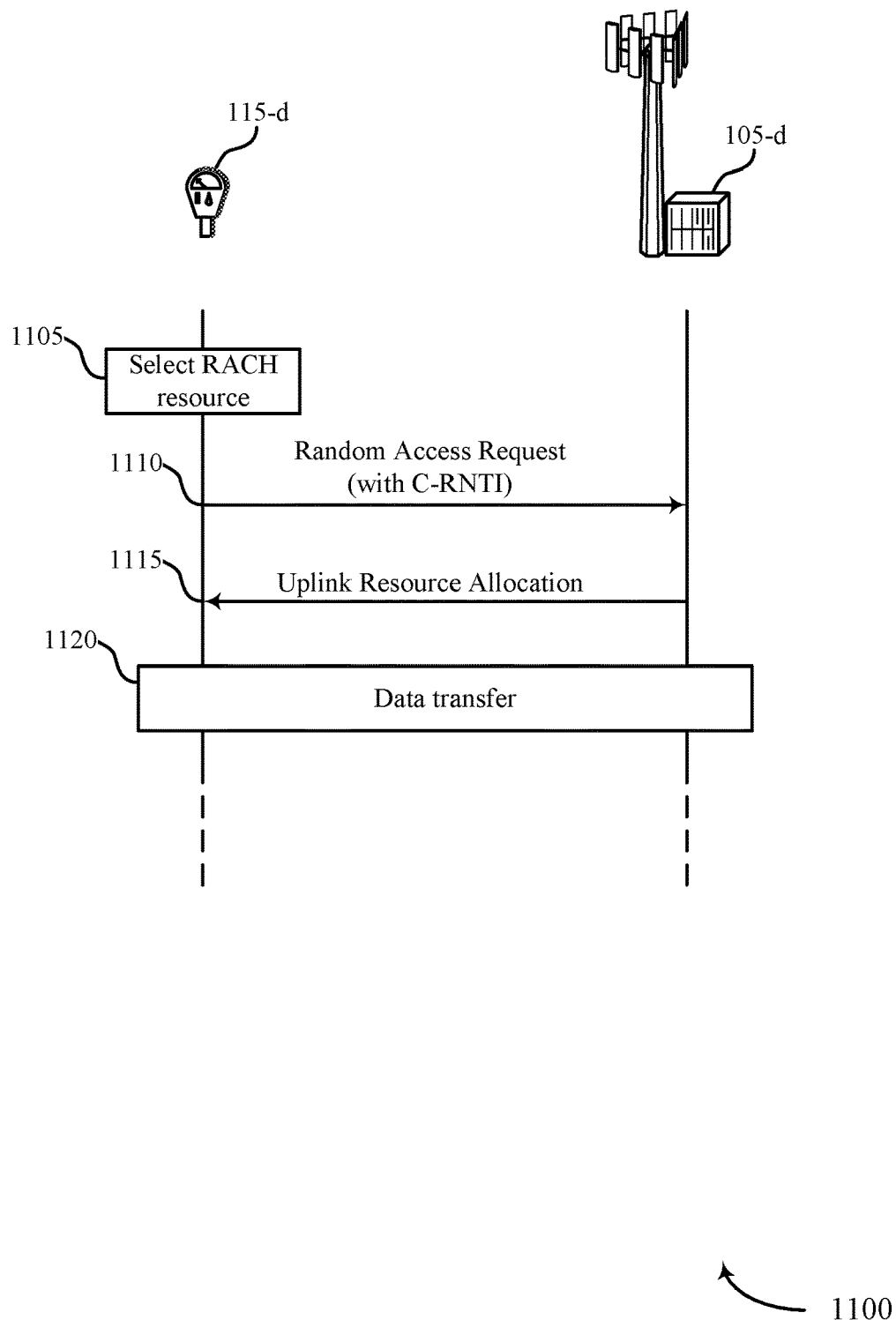

FIG. 11 illustrates an example of a process flow 1100 for random access channel design for narrowband wireless communication in accordance with various aspects of the present disclosure. Process flow 1100 may include base station 105-d and UE 115-d, which may be examples of the corresponding devices described with reference to FIG. 1-2 or 9-10.

At block 1105, the UE 115-d may select a random access resource. Such a random access resource selection may be made according to techniques as discussed above, for example. The UE 115-d may transmit a random access request 1110, which may include a C-RNTI of the UE 115-d (which may be provided from prior communications), in a manner similarly as discussed above. The base station 105-d, in response to the random access request 1110, may transmit an uplink resource allocation 1115 to the UE 115-d. The uplink resource allocation 1115 may include, for example, the C-RNTI of the UE 115-d, which may be used by the UE 115-d to confirm that the uplink resource allocation 1115 was intended for UE 115-d. The uplink resource allocation 1115 also may include an allocation of uplink resources that may be used by the UE 115-d for uplink transmissions. A data transfer 1120 may then be completed according to techniques established for communications between UE 115-d and base station 105-d. Such a process flow 1100 may be used, for example, for requesting PUSCH resources when UE 115-d is in a "RRC_Connected" state.

Figure 12:
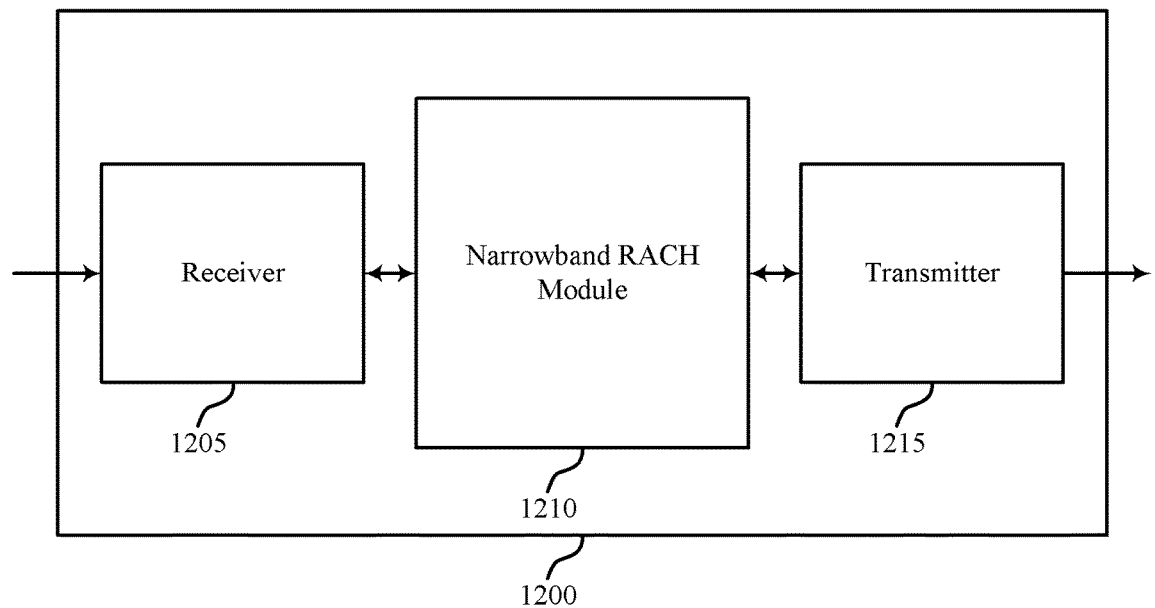
FIGS. 12 through 14 show block diagrams of a wireless device that supports random access channel design for narrowband wireless communication in accordance with aspects of the present disclosure.

FIG. 12 shows a block diagram of a wireless device 1200 that supports random access channel design for narrowband wireless communication in accordance with various aspects of the present disclosure. Wireless device 1200 may be an example of aspects of a UE 115 or base station 105 described with reference to FIG. 1. Wireless device 1200 may include receiver 1205, narrowband RACH module 1210 and transmitter 1215. Wireless device 1200 may also include a processor. Each of these components may be in communication with each other.

The receiver 1205 may receive information such as packets, user data, or control information associated with various information channels (e.g., control channels, data channels, and information related to random access channel design for narrowband wireless communication, etc.). Information may be passed on to other components of the device.

The narrowband RACH module 1210 identify a set of coverage classes for a wireless device based on characteristics of a communication link associated with the wireless device and identify, for each coverage class of the set of coverage classes, one or more subcarriers of a set of subcarriers for transmitting random access messages. In some examples, the characteristics of the communication links may include pathloss, RSRP, RSRQ, or RSSI. The narrowband RACH module 1210 may also identify a subcarrier of a set of subcarriers within a narrowband region of a wireless communications system bandwidth for transmitting a random access message, identify a payload to include in the random access message, and transmit the random access message and payload using the identified subcarrier.

The transmitter 1215 may transmit signals received from other components of wireless device 1200. In some examples, the transmitter 1215 may be collocated with a receiver in a transceiver module. The transmitter 1215 may include a single antenna, or it may include a plurality of antennas.

Figure 13:
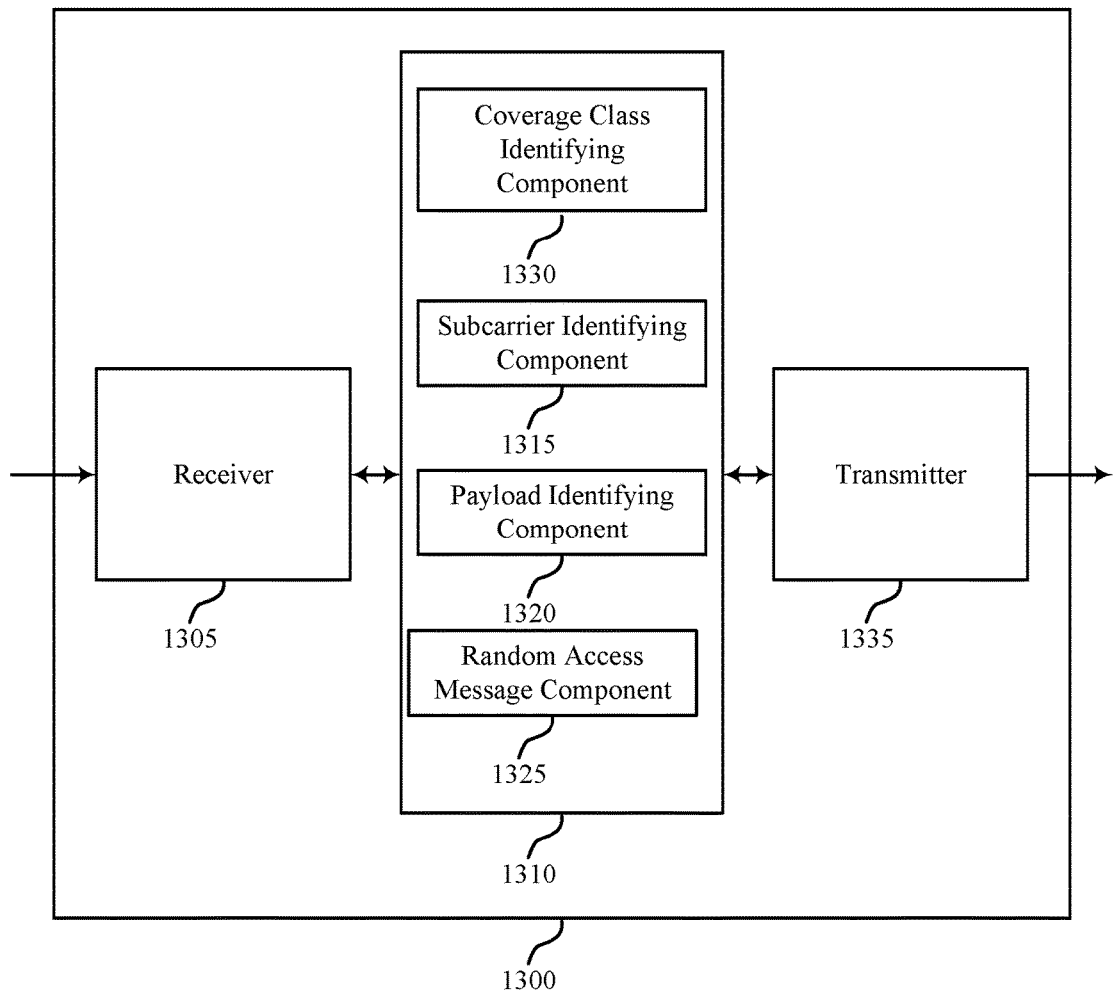

FIG. 13 shows a block diagram of a wireless device 1300 that supports random access channel design for narrowband wireless communication in accordance with various aspects of the present disclosure. Wireless device 1300 may be an example of aspects of a wireless device 1200 or a UE 115 or base station 105 described with reference to FIGS. 1-2 and 9-12. Wireless device 1300 may include receiver 1305, narrowband RACH module 1310 and transmitter 1335. Wireless device 1300 may also include a processor. Each of these components may be in communication with each other.

The receiver 1305 may receive information which may be passed on to other components of the device. The receiver 1305 may also perform the functions described with reference to the receiver 1305 of FIG. 12.

The narrowband RACH module 1310 may be an example of aspects of narrowband RACH module 1210 described with reference to FIG. 12. The narrowband RACH module 1310 may include subcarrier identifying component 1315, payload identifying component 1320, random access message component 1325 and coverage class identifying component 1330.

The subcarrier identifying component 1315 may identify a subcarrier of a set of subcarriers within a narrowband region of a wireless communications system bandwidth for transmitting a random access message and identify, for each coverage class of the set of coverage classes, one or more subcarriers of a set of subcarriers for transmitting random access messages.

The payload identifying component 1320 may identify a payload to include in the random access message. The random access message component 1325 may transmit the random access message in response to the random number corresponding to the identified token and transmit the random access message and payload using the identified subcarrier.

The coverage class identifying component 1330 may identify a set of coverage classes for a wireless device based on a pathloss associated with the wireless device. In some cases, the random access messages include a pilot signal and a payload. The pilot signal may be, for example, a length 13

Barker code, or other binary string with good cross-correlation properties. The payload may include one or more information fields, such as discussed above with respect to FIG. 8.

The transmitter 1335 may transmit signals received from other components of wireless device 1300. In some examples, the transmitter 1335 may be collocated with a receiver in a transceiver module. The transmitter 1335 may include a single antenna, or it may include a plurality of antennas.

Figure 14:
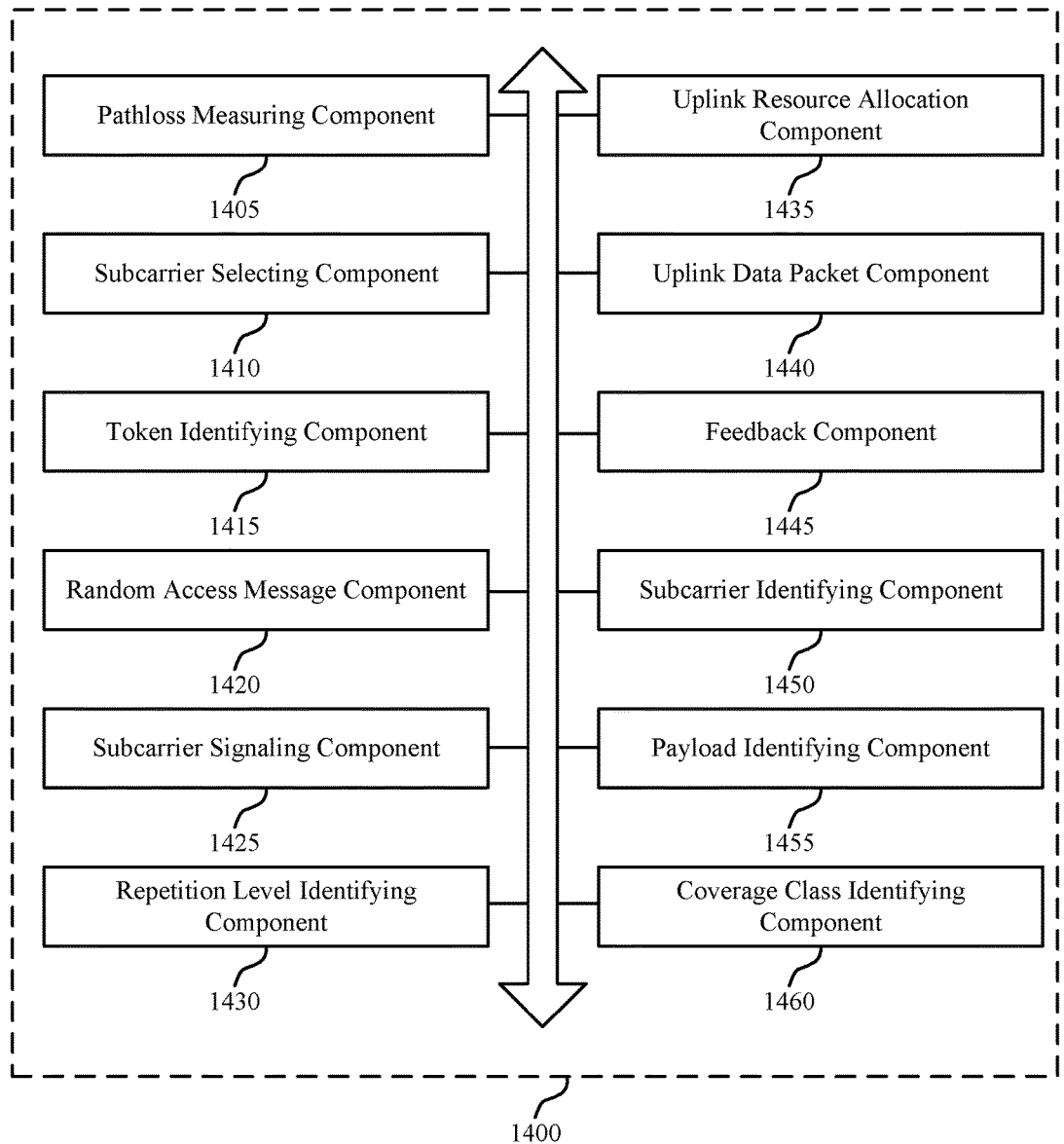

FIG. 14 shows a block diagram of a narrowband RACH module 1400 which may be an example of the corresponding component of wireless device 1200 or wireless device 1300. That is, narrowband RACH module 1400 may be an example of aspects of narrowband RACH module 1210 or narrowband RACH module 1310 described with reference to FIGS. 12 and 13.

The narrowband RACH module 1400 may include pathloss measuring component 1405, subcarrier selecting component 1410, token identifying component 1415, random access message component 1420, subcarrier signaling component 1425, repetition level identifying component 1430, uplink resource allocation component 1435, uplink data packet component 1440, feedback component 1445, subcarrier identifying component 1450, payload identifying component 1455 and coverage class identifying component 1460. Each of these modules may communicate, directly or indirectly, with one another (e.g., via one or more buses).

The pathloss measuring component 1405 may measure the pathloss at the wireless device. The subcarrier selecting component 1410 may select a subcarrier based on an identified coverage class and select a first subcarrier of the set of subcarriers for transmission of a random access message based on the first coverage class.

The token identifying component 1415 may be configured to identify a token for each coverage class, and the transmission of the random access message may include determining a random number associated with the random access message. The random access message component 1420 may transmit the random access message in response to the random number corresponding to the identified token (e.g., having a value less than a value of the token or within a value range of the token) and transmit the random access message and payload using the identified subcarrier.

The subcarrier signaling component 1425 may signal the identified one or more subcarriers for transmitting random access messages for each coverage class to a plurality of wireless devices. The repetition level identifying component 1430 may identify a repetition level for transmitting redundant versions of a random access message for each coverage class of the set of coverage classes.

The uplink resource allocation component 1435 may receive an uplink resource allocation based on the random access message. The uplink data packet component 1440 may transmit an uplink data packet based on the uplink resource allocation. The feedback component 1445 may receive feedback (e.g., ACK/NACK feedback) to acknowledge successful receipt of the uplink data packet.

The subcarrier identifying component 1450 may identify a subcarrier of a set of subcarriers within a narrowband region of a wireless communications system bandwidth for transmitting a random access message and identify, for each coverage class of the set of coverage classes, one or more subcarriers of a set of subcarriers for transmitting random access messages. The payload identifying component 1455 may identify a payload to include in the random access message.

The coverage class identifying component 1460 may identify a set of coverage classes for a wireless device based on a pathloss associated with the wireless device. In some cases, the random access messages include a pilot signal and a payload.

Figure 15:
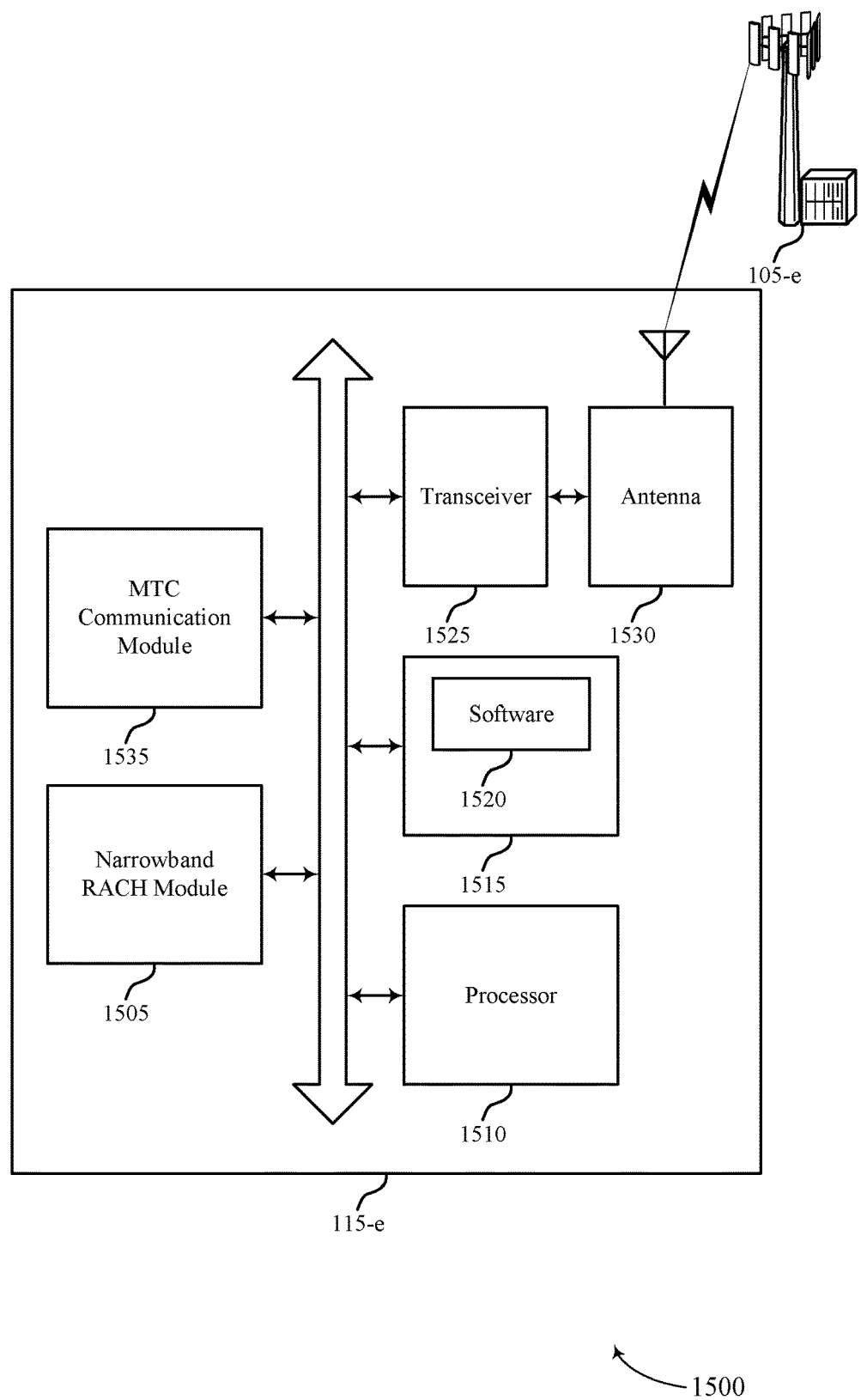
FIG. 15 illustrates a block diagram of a system including a UE that supports random access channel design for narrowband wireless communication in accordance with aspects of the present disclosure.

FIG. 15 shows a diagram of a system 1500 including a device that supports random access channel design for narrowband wireless communication in accordance with various aspects of the present disclosure. For example, system 1500 may include UE 115-e, which may be an example of a wireless device 1200, a wireless device 1300, or a UE 115 as described with reference to FIGS. 1, 2 and 9 through 14.

UE 115-e may also include narrowband RACH module 1505, processor 1510, memory 1515, transceiver 1525, antenna 1530 and an MTC communication module 1535. Each of these modules may communicate, directly or indirectly, with one another (e.g., via one or more buses).

The narrowband RACH module 1505 may be an example of a narrowband RACH module as described with reference to FIGS. 12 through 14. The processor 1510 may include an intelligent hardware device, (e.g., a central processing unit (CPU), a microcontroller, an application specific integrated circuit (ASIC), etc.)

The memory 1515 may include random access memory (RAM) and read only memory (ROM). The memory 1515 may store computer-readable, computer-executable software including instructions that, when executed, cause the processor to perform various functions described herein (e.g., random access channel design for narrowband wireless communication, etc.). In some cases, the software 1520 may not be directly executable by the processor but may cause a computer (e.g., when compiled and executed) to perform functions described herein.

The transceiver 1525 may communicate bi-directionally, via one or more antennas, wired, or wireless links, with one or more networks, as described above. For example, the transceiver 1525 may communicate bi-directionally with a base station 105 or a UE 115. The transceiver 1525 may also include a modem to modulate the packets and provide the modulated packets to the antennas for transmission, and to demodulate packets received from the antennas.

In some cases, the wireless device may include a single antenna 1530. However, in some cases the device may have more than one antenna 1530, which may be capable of concurrently transmitting or receiving multiple wireless transmissions.

The MTC communication module 1535 may enable operations using MTC communications such as communication based on one or more events or measurements to be reported by the UE 115-e.

Figure 16:
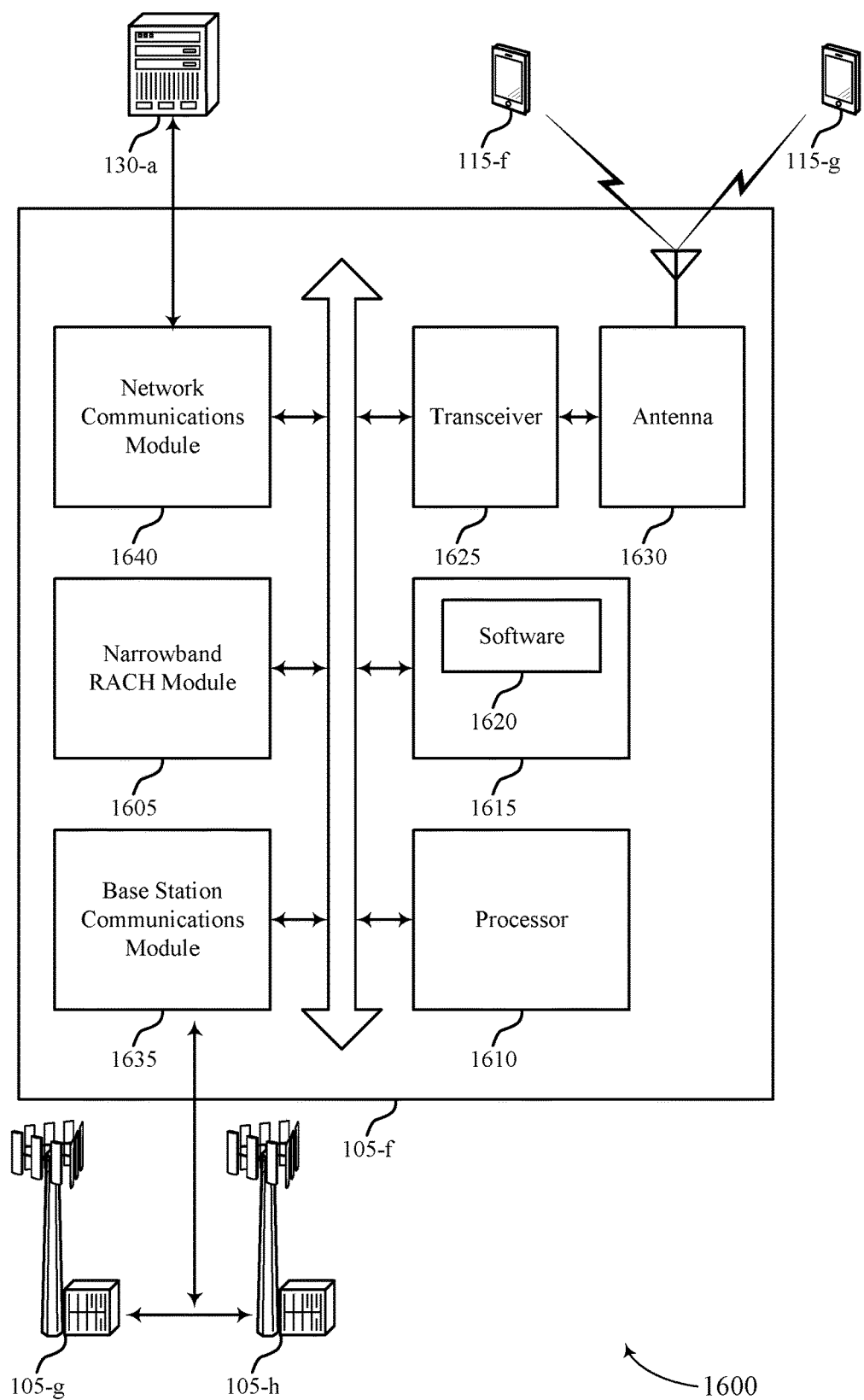
FIG. 16 illustrates a block diagram of a system including a base station that supports random access channel design for narrowband wireless communication in accordance with aspects of the present disclosure.

FIG. 16 shows a diagram of a wireless system 1600 including a device that supports random access channel design for narrowband wireless communication in accordance with various aspects of the present disclosure. For example, system 1600 may include base station 105-f, which may be an example of a wireless device 1200, a wireless device 1300, or a base station 105 as described with reference to FIGS. 1, 2 and 9 through 14. Base station 105-f may also include components for bi-directional voice and data communications including components for transmitting communications and components for receiving communications. For example, base station 105-f may communicate bi-directionally with one or more UEs 115-f or 115-g.

Base station 105-f may also include narrowband RACH module 1605, processor 1610, memory 1615, transceiver 1625, antenna 1630, base station communications module 1635 and network communications module 1640. Each of these modules may communicate, directly or indirectly, with one another (e.g., via one or more buses).

The narrowband RACH module 1605 may be an example of a narrowband RACH module as described with reference to FIGS. 12 through 14. The processor 1610 may include an intelligent hardware device, (e.g., a CPU, a microcontroller, an ASIC, etc.)

The memory 1615 may include RAM and ROM. The memory 1615 may store computer-readable, computer-executable software including instructions that, when executed, cause the processor to perform various functions described herein (e.g., random access channel design for narrowband wireless communication, etc.). In some cases, the software 1620 may not be directly executable by the processor but may cause a computer (e.g., when compiled and executed) to perform functions described herein.

The transceiver 1625 may communicate bi-directionally, via one or more antennas, wired, or wireless links, with one or more networks, as described above. For example, the transceiver 1625 may communicate bi-directionally with a base station 105 or a UE 115. The transceiver 1625 may also include a modem to modulate the packets and provide the modulated packets to the antennas for transmission, and to demodulate packets received from the antennas. In some cases, the wireless device may include a single antenna 1630. However, in some cases the device may have more than one antenna 1530, which may be capable of concurrently transmitting or receiving multiple wireless transmissions.

The base station communications module 1635 may manage communications with other base stations 105, such as base station 105-g or base station 105-h, and may include a controller or scheduler for controlling communications with UEs 115 in cooperation with other base stations 105. For example, the base station communications module 1635 may coordinate scheduling for transmissions to UEs 115 for various interference mitigation techniques such as beamforming or joint transmission. In some examples, base station communications module 1635 may provide an X2 interface within an LTE/LTE-A wireless communication network technology to provide communication between one or more other base stations 105.

The network communications module 1640 may manage communications with the core network (e.g., via one or more wired backhaul links). For example, the network communications module 1640 may manage the transfer of data communications for client devices, such as one or more UEs 115.

Figure 17:
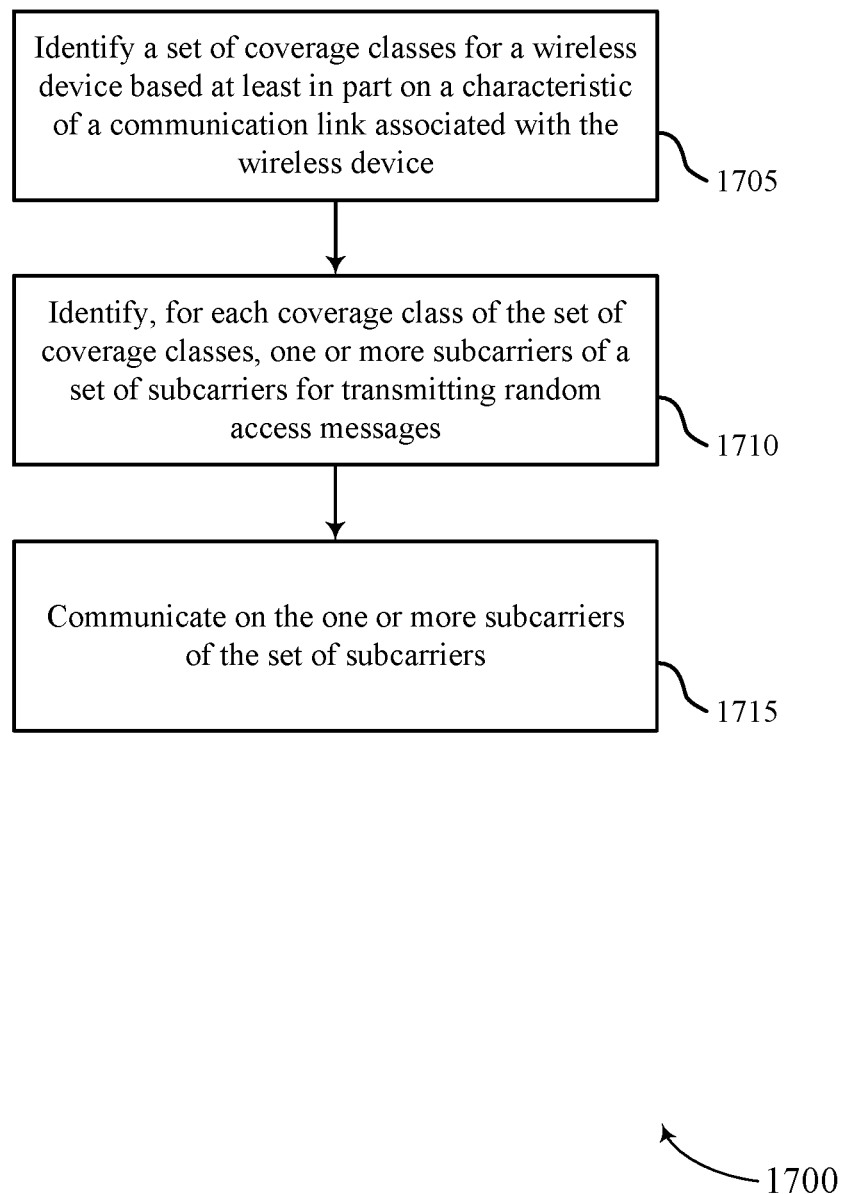
FIGS. 17 through 19 illustrate methods for random access channel design for narrowband wireless communication in accordance with aspects of the present disclosure.

FIG. 17 shows a flowchart illustrating a method 1700 for random access channel design for narrowband wireless communication in accordance with various aspects of the present disclosure. The operations of method 1700 may be implemented by a UE 115 or base station 105 or its components as described with reference to FIG. 1-2, or 9-16. For example, the operations of method 1700 may be performed by the narrowband RACH module as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1705, the UE 115 or base station 105 may identify a set of coverage classes for a wireless device based on a characteristic of a communication link associated with the wireless device, as described above with reference to FIGS. 2 through 11. In certain examples, the operations of block 1705 may be performed by the coverage class identifying component as described with reference to FIG. 14.

At block 1710, the UE 115 or base station 105 may identify, for each coverage class of the set of coverage classes, one or more subcarriers of a set of subcarriers for transmitting random access messages as described above with reference to FIGS. 2 through 11. In certain examples, the operations of block 1710 may be performed by the subcarrier identifying component as described with reference to FIG. 14.

At block 1715, the UE 115 or base station 105 may communicate on the one or more subcarriers of the set of subcarriers as described above with reference to FIGS. 2 through 11. In certain examples, the operations of block 1710 may be performed by the subcarrier identifying component as described with reference to FIG. 14.

Figure 18:
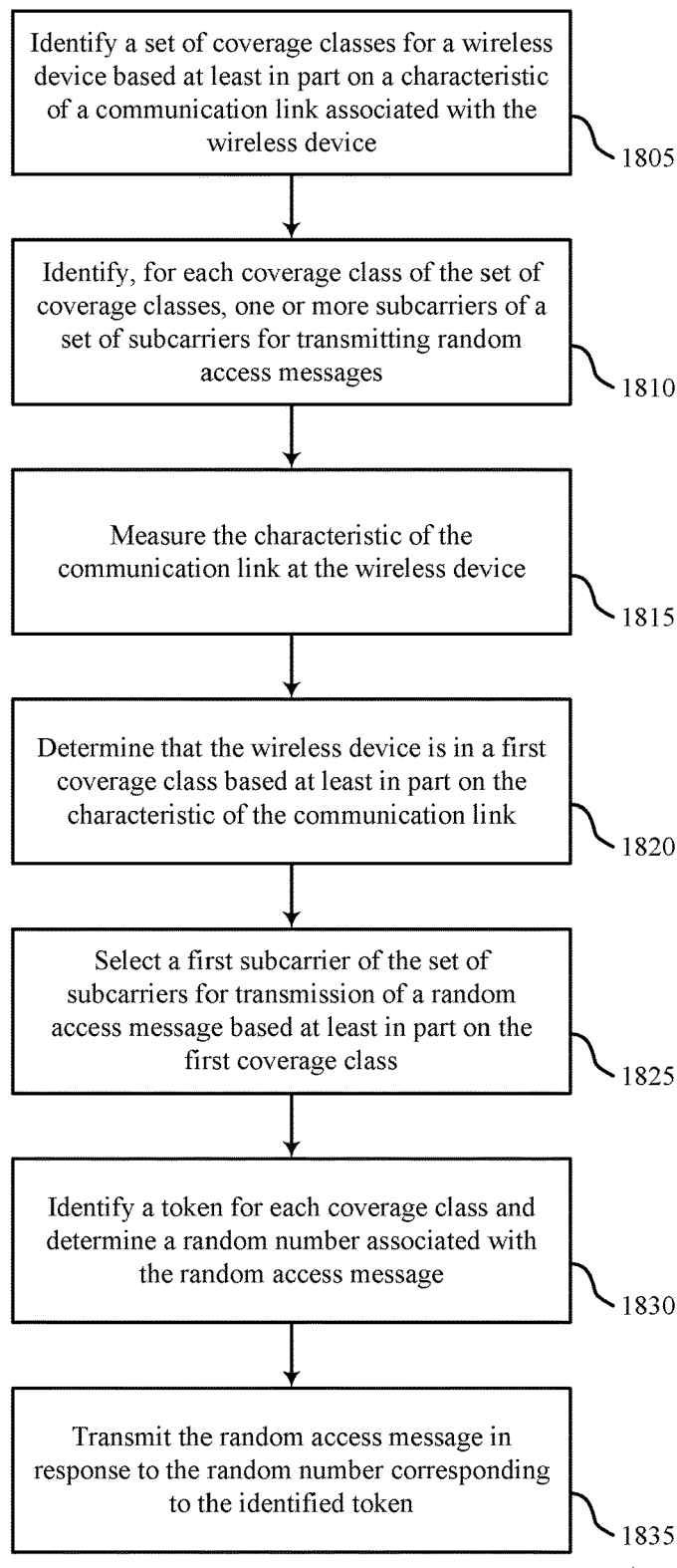

FIG. 18 shows a flowchart illustrating a method 1800 for random access channel design for narrowband wireless communication in accordance with various aspects of the present disclosure. The operations of method 1800 may be implemented by a UE 115 or its components as described with reference to FIGS. 1-2 or 9-16. For example, the operations of method 1800 may be performed by the narrowband RACH module as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may identify a set of coverage classes for a wireless device based on a characteristic of a communication link associated with the wireless device as described above with reference to FIGS. 2 through 11. In certain examples, the operations of block 1805 may be performed by the coverage class identifying component as described with reference to FIG. 14.

At block 1810, the UE 115 may identify, for each coverage class of the set of coverage classes, one or more subcarriers of a set of subcarriers for transmitting random access messages as described above with reference to FIGS. 2 through 11. In certain examples, the operations of block 1810 may be performed by the subcarrier identifying component as described with reference to FIG. 14.

At block 1815, the UE 115 may measure the characteristic of the communication link at the wireless device as described above with reference to FIGS. 2 through 11. In certain examples, the operations of block 1815 may be performed by the pathloss measuring component as described with reference to FIG. 14.

At block 1820, the UE 115 may determine that the wireless device is in a first coverage class based on the characteristic of the communication link, as described above with reference to FIGS. 2 through 11. In certain examples, the operations of block 1820 may be performed by the coverage class identifying component as described with reference to FIG. 14.

At block 1825, the UE 115 may select a first subcarrier of the set of subcarriers for transmission of a random access message based on the first coverage class as described above with reference to FIGS. 2 through 11. In certain examples, the operations of block 1825 may be performed by the subcarrier selecting component as described with reference to FIG. 14.

At block 1830, the UE 115 may identify a token for each coverage class and determine a random number associated with the random access message, as described above with reference to FIGS. 2 through 11. In certain examples, the operations of block 1830 may be performed by the token identifying component as described with reference to FIG. 14.

At block 1835, the UE 115 may transmit the random access message in response to the random number corresponding to the identified token, as described above with reference to FIGS. 2 through 11. In certain examples, the operations of block 1835 may be performed by the random access message component as described with reference to FIG. 14.

Figure 19:
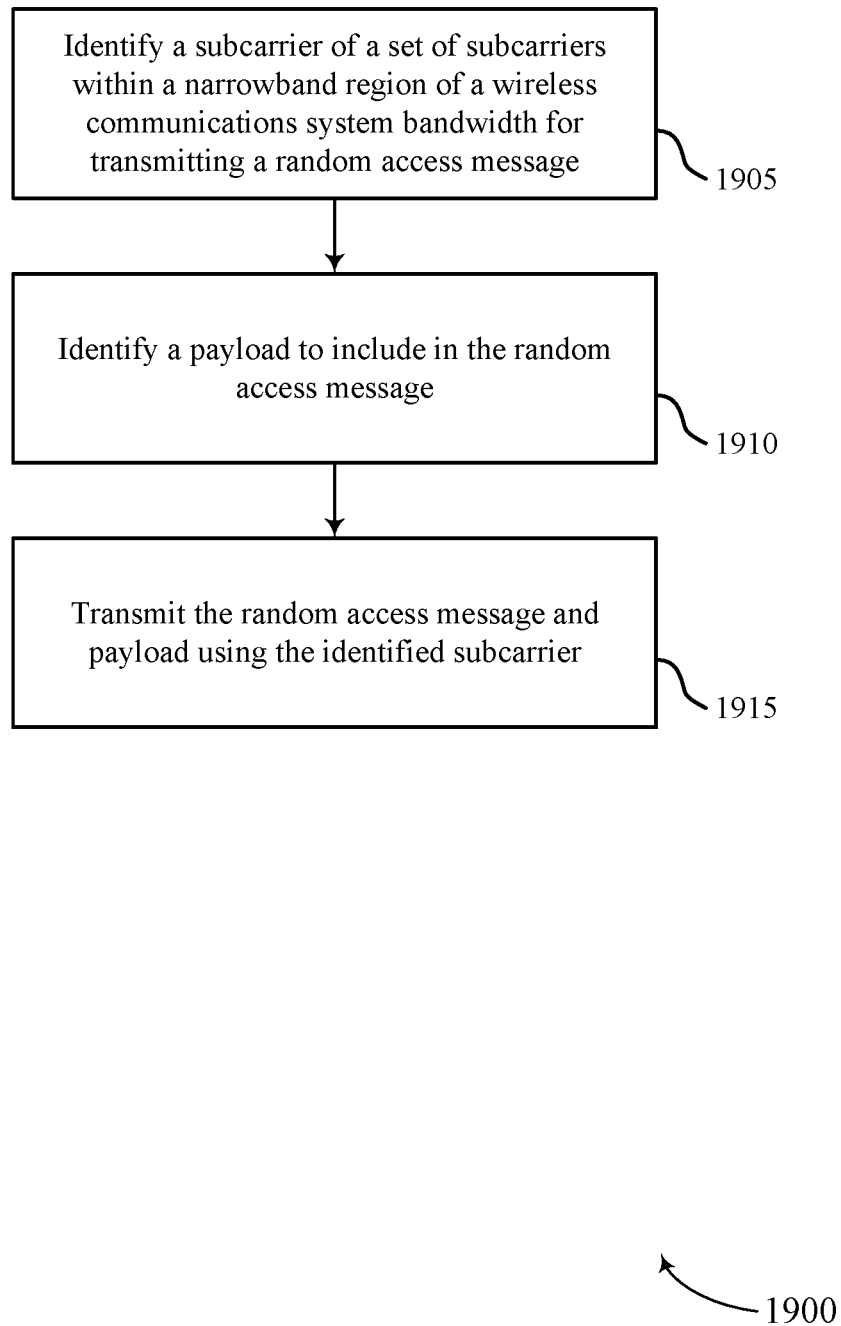

FIG. 19 shows a flowchart illustrating a method 1900 for random access channel design for narrowband wireless communication in accordance with various aspects of the present disclosure. The operations of method 1900 may be implemented by a UE 115 or its components as described with reference to FIG. 1-2 or 9-16. For example, the operations of method 1900 may be performed by the narrowband RACH module as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may identify a subcarrier of a set of subcarriers within a narrowband region of a wireless communications system bandwidth for transmitting a random access message as described above with reference to FIGS. 2 through 11. In certain examples, the operations of block 1905 may be performed by the subcarrier identifying component as described with reference to FIG. 14.

At block 1910, the UE 115 may identify a payload to include in the random access message as described above with reference to FIGS. 2 through 11. In certain examples, the operations of block 1910 may be performed by the payload identifying component as described with reference to FIG. 14.

At block 1915, the UE 115 may transmit the random access message and payload using the identified subcarrier as described above with reference to FIGS. 2 through 11. In certain examples, the operations of block 1915 may be performed by the random access message component as described with reference to FIG. 14.

In some examples, the payload may transmitted using a subset of subcarriers of the set of subcarriers. In some examples, the UE 115 may transmit the payload on each subcarrier of the subset of subcarriers. In some examples, the UE 115 may divide the payload into a plurality of portions, generate redundancy portions from the payload, and transmit a subset of the plurality of portions and a subset of redundancy portions on each subcarrier of the subset of subcarriers.

It should be noted that these methods describe possible implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for random access channel design for narrowband wireless communication.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), frequency division multiple access (FDMA) (FDMA), orthogonal frequency division multiple access (OFDMA) (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell may cover a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink (DL) transmissions described herein may also be called forward link transmissions while the uplink (UL) transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for random access channel design for narrowband wireless communication. It should be noted that these methods describe possible implementation, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be performed by one or more other processing units (or cores), on at least one IC. In various examples, different types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

What is claimed is:

1. A method for wireless communication, comprising:
identifying a coverage class for a wireless device based at least in part on a characteristic of a communication link associated with the wireless device;
identifying, for the coverage class a subset of subcarriers of a set of subcarriers for transmitting random access messages, the subset of subcarriers being within a narrowband region of a wireless communications system bandwidth; and
communicating on the subset of subcarriers of the set of subcarriers.

2. The method of claim 1, further comprising:
measuring the characteristic of the communication link at the wireless device;
determining that the wireless device is in a first coverage class based at least in part on the characteristic of the communication link; and
selecting a first subcarrier of the subset of subcarriers for transmission of a random access message based at least in part on determining that the wireless device is in the first coverage class.

3. The method of claim 2, further comprising:
identifying a token for each coverage class of a set of coverage classes, wherein transmitting the random access message comprises:
determining a random number associated with the random access message; and
transmitting the random access message in response to the random number corresponding to the identified token.

4. The method of claim 1, further comprising:
signaling the identified subset of subcarriers for transmitting random access messages for the coverage class to a plurality of wireless devices.

5. The method of claim 1, wherein a subcarrier spacing of adjacent subcarriers of the subset of subcarriers corresponds to a same subcarrier spacing as used for data communications within the narrowband region of the wireless communications system bandwidth.

6. The method of claim 1, wherein random access messages are transmitted using a single subcarrier of the subset of subcarriers.

7. The method of claim 1, wherein random access messages and data communications are time division multiplexed on one or more of the subcarriers.

8. The method of claim 1, further comprising:
identifying a repetition level for transmitting redundant versions of a random access message for each coverage class of a set of coverage classes.

9. The method of claim 1, wherein random access messages are transmitted asynchronously.

10. The method of claim 9, wherein the random access messages comprise a pilot signal and a payload.

11. The method of claim 10, wherein the payload comprises one or more of an identification of a random access type, a wireless device identity, an access cause, or a coverage class of the wireless device.

12. The method of claim 1, further comprising:
selecting a subcarrier based at least in part on an identified coverage class;
transmitting a random access message using the selected subcarrier, wherein the random access message comprises a random identification number;
receiving an uplink resource allocation based at least in part on the random access message;
transmitting an uplink data packet based at least in part on the uplink resource allocation; and
receiving feedback to acknowledge successful receipt of the uplink data packet.

13. The method of claim 12, further comprising:
determining that additional uplink resources are needed for transmission of uplink data;
transmitting a second random access message based at least in part on the determining, the second random access message comprising an identification provided for the wireless device by a base station;
receiving a second uplink resource allocation based at least in part on the second random access message; and
transmitting a second uplink data packet based at least in part on the second uplink resource allocation.

14. The method of claim 1, further comprising:
identifying a subcarrier of the subset of subcarriers within the narrowband region for transmitting a random access message;
identifying a payload to include in the random access message; and
transmitting the random access message and the payload using the identified subcarrier.

15. The method of claim 14, wherein the payload is transmitted using the subset of subcarriers of the set of subcarriers.

16. The method of claim 15, further comprises:
transmitting the payload on each subcarrier of the subset of subcarriers.

17. The method of claim 15, further comprising:
dividing the payload into a plurality of portions;
generating redundancy portions from the payload; and
transmitting a subset of the plurality of portions and a subset of redundancy portions on each subcarrier of the subset of subcarriers.

18. The method of claim 1, wherein the characteristic of the communication link is a pathloss of the communication link.

19. The method of claim 1, wherein the characteristic of the communication link is one of a reference signal received power (RSRP), a reference signal received quality (RSRQ), or a received signal strength indicator (RSSI).

20. An apparatus for wireless communication, comprising:
means for identifying a coverage class for a wireless device based at least in part on a characteristic of a communication link associated with the wireless device;
means for identifying, for the coverage class, a subset of subcarriers of a set of subcarriers for transmitting random access messages, the subset of subcarriers being within a narrowband region of a wireless communications system bandwidth; and
means for communicating on the subset of subcarriers of the set of subcarriers.

21. The apparatus of claim 20, further comprising:
means for measuring the characteristic of the communication link at the wireless device;

means for determining that the wireless device is in a first coverage class based at least in part on the characteristic of the communication link; and means for selecting a first subcarrier of the subset of subcarriers for transmission of a random access message based at least in part on determining that the wireless device is in the first coverage class.

22. The apparatus of claim 21, further comprising:
means for identifying a token for each coverage class of a set of coverage classes;
means for determining a random number associated with the random access message; and
means for transmitting the random access message in response to the random number corresponding to the identified token.

23. The apparatus of claim 20, further comprising:
means for signaling the identified subset of subcarriers for transmitting random access messages for the coverage class to a plurality of wireless devices.

24. The apparatus of claim 20, wherein a subcarrier spacing of adjacent subcarriers of the subset of subcarriers corresponds to a same subcarrier spacing as used for data communications within the narrowband region of the wireless communications system bandwidth.

25. The apparatus of claim 20, further comprising:
means for transmitting the random access messages using a single subcarrier of the subset of subcarriers.

26. The apparatus of claim 20, wherein the random access messages and data communications are time division multiplexed on one or more of the sub carriers.

27. The apparatus of claim 20, further comprising:
identifying a repetition level for transmitting redundant versions of a random access message for each coverage class of a set of coverage classes.

28. The apparatus of claim 20, further comprising:
means for transmitting the random access messages asynchronously.

29. The apparatus of claim 28, wherein the random access messages comprise a pilot signal and a payload.

30. The apparatus of claim 29, wherein the payload comprises one or more of an identification of a random access type, a wireless device identity, an access cause, or a coverage class of the wireless device.

31. The apparatus of claim 20, further comprising:
means for selecting a subcarrier based at least in part on an identified coverage class;
means for transmitting a random access message using the selected subcarrier, wherein the random access message comprises a random identification number;
means for receiving an uplink resource allocation based at least in part on the random access message;
means for transmitting an uplink data packet based at least in part on the uplink resource allocation; and
means for receiving feedback to acknowledge successful receipt of the uplink data packet.

32. The apparatus of claim 31, further comprising:
means for determining that additional uplink resources are needed for transmission of uplink data;
means for transmitting a second random access message based at least in part on the determining, the second random access message comprising an identification provided for the wireless device by a base station;
means for receiving a second uplink resource allocation based at least in part on the second random access message; and
means for transmitting a second uplink data packet based at least in part on the second uplink resource allocation.

33. The apparatus of claim 20, further comprising:
means for identifying a subcarrier of the subset of subcarriers within the narrowband region for transmitting a random access message;
means for identifying a payload to include in the random access message; and
means for transmitting the random access message and the payload using the identified subcarrier.

34. The apparatus of claim 33, wherein the means for transmitting the random access message and is operable to use the subset of subcarriers of the set of subcarriers.

35. The apparatus of claim 34, further comprising:
means for transmitting the payload on each subcarrier of the subset of subcarriers.

36. The apparatus of claim 34, further comprising:
means for dividing the payload into a plurality of portions;
means for generating redundancy portions from the payload; and
means for transmitting a subset of the plurality of portions and a subset of redundancy portions on each subcarrier of the subset of subcarriers.

37. The apparatus of claim 20, wherein the characteristic of the communication link is a pathloss of the communication link.

38. The apparatus of claim 20, wherein the characteristic of the communication link is one of a reference signal received power (RSRP), a reference signal received quality (RSRQ), or a received signal strength indicator (RSSI).

39. An apparatus for wireless communication, comprising:
a processor;
memory in electronic communication with the processor; and
instructions stored in the memory and operable, when executed by the processor, to cause the apparatus to:
identify a coverage class for a wireless device based at least in part on a characteristic of a communication link associated with the wireless device;
identify, for the coverage class, a subset of subcarriers of a set of subcarriers for transmitting random access messages, the subset of subcarriers being within a narrowband region of a wireless communications system bandwidth; and
communicate on the subset of subcarriers of the set of subcarriers.

40. The apparatus of claim 39, wherein the instructions are executable by the processor to cause the apparatus to:
measure the characteristic of the communication link at the wireless device;
determine that the wireless device is in a first coverage class based at least in part on the characteristic of the communication link; and
select a first subcarrier of the subset of subcarriers for transmission of a random access message based at least in part on determining that the wireless device is in the first coverage class.

41. The apparatus of claim 40, wherein the instructions are executable by the processor to cause the apparatus to:
identify a token for each coverage class of a set of coverage classes;
determine a random number associated with the random access message; and
transmit the random access message in response to the random number corresponding to the identified token.

42. The apparatus of claim 39, wherein the instructions are executable by the processor to cause the apparatus to:

signal the identified subset of subcarriers for transmitting random access messages for each coverage class to a plurality of wireless devices.

43. The apparatus of claim 39, wherein a subcarrier spacing of adjacent subcarriers of the subset of subcarriers corresponds to a same subcarrier spacing as used for data communications within the narrowband region of the wireless communications system bandwidth.

44. The apparatus of claim 39, wherein the instructions are executable by the processor to cause the apparatus to:
transmit the random access messages using a single subcarrier of the subset of sub carriers.

45. The apparatus of claim 39, wherein the random access messages and data communications are time division multiplexed on one or more of the sub carriers.

46. The apparatus of claim 39, wherein the instructions are executable by the processor to cause the apparatus to:
identify a repetition level for transmitting redundant versions of a random access message for each coverage class of a set of coverage classes.

47. The apparatus of claim 39, wherein the instructions are executable by the processor to cause the apparatus to:
transmit the random access messages asynchronously.

48. The apparatus of claim 47, wherein the random access messages comprise a pilot signal and a payload.

49. The apparatus of claim 48, wherein the payload comprises one or more of an identification of a random access type, a wireless device identity, an access cause, or a coverage class of the wireless device.

50. The apparatus of claim 39, wherein the instructions are executable by the processor to cause the apparatus to:
select a subcarrier based at least in part on an identified coverage class;
transmit a random access message using the selected subcarrier, wherein the random access message comprises a random identification number;
receive an uplink resource allocation based at least in part on the random access message;
transmit an uplink data packet based at least in part on the uplink resource allocation; and
receive feedback to acknowledge successful receipt of the uplink data packet.

51. The apparatus of claim 50, wherein the instructions are executable by the processor to cause the apparatus to:
determine that additional uplink resources are needed for transmission of uplink data;
transmit a second random access message based at least in part on the determining, the second random access message comprising an identification provided for the wireless device by a base station;
receive a second uplink resource allocation based at least in part on the second random access message; and
transmit a second uplink data packet based at least in part on the second uplink resource allocation.

52. The apparatus of claim 39, wherein the instructions are executable by the processor to cause the apparatus to:
identify a subcarrier of the subset of subcarriers within the narrowband region for transmitting a random access message;
identify a payload to include in the random access message; and
transmit the random access message and the payload using the identified subcarrier.

53. The apparatus of claim 52, wherein the instructions are executable by the processor to cause the apparatus to:
transmit the payload using the subset of subcarriers of the set of subcarriers.

54. The apparatus of claim 53, wherein the instructions are executable by the processor to cause the apparatus to:
transmit the payload on each subcarrier of the subset of subcarriers.

55. The apparatus of claim 53, wherein the instructions are executable by the processor to cause the apparatus to:
divide the payload into a plurality of portions;
generate redundancy portions from the payload; and
transmit a subset of the plurality of portions and a subset of redundancy portions on each subcarrier of the subset of subcarriers.

56. The apparatus of claim 39, wherein the characteristic of the communication link is a pathloss of the communication link.

57. The apparatus of claim 39, wherein the characteristic of the communication link is one of a reference signal received power (RSRP), a reference signal received quality (RSRQ), or a received signal strength indicator (RSSI).

58. A non-transitory computer readable medium storing code for wireless communication, the code comprising instructions executable by a processor to:
identify a coverage class for a wireless device based at least in part on a characteristic of a communication link associated with the wireless device;
identify, for the coverage class, a subset of subcarriers of a set of subcarriers for transmitting random access messages, the subset of subcarriers being within a narrowband region of a wireless communications system bandwidth; and
communicating on the subset of subcarriers of the set of subcarriers.

* * * * *